United States Patent [19]
Kato

[11] Patent Number: 6,133,341
[45] Date of Patent: Oct. 17, 2000

[54] OIL-BASED INK FOR PREPARATION OF PRINTING PLATE BY INK JET PROCESS AND METHOD FOR PREPARATION OF PRINTING PLATE USING THE SAME

[75] Inventor: Eiichi Kato, Shizuoka, Japan

[73] Assignee: Fuji Photo Film Co., Ltd., Kanagawa, Japan

[21] Appl. No.: 09/215,010

[22] Filed: Dec. 17, 1998

[30] Foreign Application Priority Data

Dec. 18, 1997 [JP] Japan ................................. 9-349736

[51] Int. Cl.⁷ ........................... C09D 11/02; C09D 11/10; G03G 13/28
[52] U.S. Cl. ............................... 523/160; 430/49
[58] Field of Search ................... 523/160, 161; 106/31.6; 430/114, 115, 137, 49, 126, 904, 270, 302; 347/54, 55, 103, 107

[56] References Cited

U.S. PATENT DOCUMENTS

| | | | |
|---|---|---|---|
| 4,599,288 | 7/1986 | Fuchizawa | 430/63 |
| 4,665,002 | 5/1987 | Dan et al. | 430/114 |
| 4,983,486 | 1/1991 | Kato et al. | 430/115 |
| 5,039,598 | 8/1991 | Abramsohn et al. | 430/347 |
| 5,106,716 | 4/1992 | Kato et al. | 430/114 |
| 5,308,730 | 5/1994 | Suzuki et al. | 430/115 |
| 5,342,725 | 8/1994 | Kato | 430/115 |
| 5,582,106 | 12/1996 | Kanda et al. | 101/462 |
| 5,683,841 | 11/1997 | Kato | 430/49 |
| 5,714,250 | 2/1998 | Kato et al. | 428/328 |
| 5,914,211 | 6/1999 | Hashino et al. | 430/166 |

*Primary Examiner*—Vasu Jagannathan
*Assistant Examiner*—Callie E. Shosho
*Attorney, Agent, or Firm*—Reed Smith Shaw & McClay LLP

[57] ABSTRACT

A method is presented for preparing a lithographic printing plate by an ink jet process of discharging dropwise an oil-based ink using electrostatic attraction onto a lithographic printing plate precursor to form an image. The lithographic printing plate precursor has a water-resistant support having provided thereon an image-receiving layer having a lithographically printable hydrophilic surface for forming the image. The water-resistant support has a specific electric resistance of $10^{10}$ Ωcm or less in an area directly under the image-receiving layer. The oil-based ink is composed of positively or negatively charged electroscopic resin particles dispersed in a nonaqueous carrier liquid having an electric resistance of $10^9$ Ωcm or more and a dielectric constant of 3.5 or less. The resin particles are copolymer resin particles obtained by polymerization granulation of a solution of a monofunctional monomer, a monofunctional macromonomer and a resin for dispersion stabilization.

9 Claims, 2 Drawing Sheets

OIL-BASED INK FOR PREPARATION OF PRINTING PLATE BY INK JET PROCESS AND METHOD FOR PREPARATION OF PRINTING PLATE USING THE SAME

FILED OF THE INVENTION

The present invention relates to an oil-based ink for the preparation of a printing plate by an ink jet process, and a method for the preparation of a printing plate by an ink jet process using the same. More particularly, the present invention relates to an oil-based ink excellent in dispersion stability, redispersibility, storage stability, image reproducibility and printing durability (press life), and a method for the preparation of a printing plate by an ink jet process using the same.

BACKGROUND OF THE INVENTION

With development in business machines and progress in office automation in recent years, in the field of small-scale commercial printing, platemaking systems wherein an image is formed on a direct imaging type lithographic printing plate precursor comprising a water-resistant support having provided thereon an image receiving layer having a hydrophilic surface in a various manner to prepare an offset lithographic printing plate have been widely employed.

A conventional lithographic printing plate precursor for direct imaging type comprises a support made of paper subjected to water-resistant treatment or a plastic film having provided thereon an image accepting layer (or an image receiving layer) containing an inorganic pigment, a water-soluble resin and a water resistance imparting agent. On such a direct imaging type lithographic printing plate precursor, a lipophilic image is formed with a typewriter or by hand writing, using a lipophilic ink, or by transferring an image from an ink ribbon by heat melting with a heat transfer printer, thereby preparing a printing plate.

However, the printing plate prepared by such a method is not sufficient in mechanical strength of image areas, so that cutting easily takes place in the image areas during printing.

On the other hand, ink jet recording is a recording method low in noise and printable at a high speed, and has recently been rapidly popularized.

As such ink jet recording methods, there are proposed various systems such as a so-called electric field controlling system in which ink is discharged using electrostatic attraction, a so-called drop-on-demand system (pressure pulse system) in which ink is discharged using oscillation pressure of a piezoelectric element, and a so-called bubble (thermal) jet system in which ink is discharged using pressure generated by forming bubbles and allowing them to grow up with heating at high temperature. According to these systems, highly accurate images can be obtained.

In these ink jet recording systems, aqueous ink using water as a main solvent, and oil-based ink using an organic solvent as a main solvent are conventionally employed.

It is also known that plate making is performed using an ink jet printer on a lithographic printing plate precursor for direct imaging type described above. In this case, although aqueous ink in which water is used as a dispersion medium is employed, the aqueous ink has the problems in that blurs appear in images formed on the precursor and in that an image drawing speed is decreased because of slow drying. In order to overcome such problems, a method using oil-based ink in which a nonaqueous solvent is used as a dispersion medium is proposed as described in JP-A-54-117203 (the term "JP-A" as used herein means an "unexamined published Japanese patent application").

However, this method is still insufficient, because blurs are actually observed in images formed by plate making and further blurs are generated in prints upon printing. Further, the number of prints obtained is limited to several hundreds at the most. Moreover, such ink has the problem of being liable to clog a nozzle for discharging minute ink droplets which make it possible to obtain images having high resolution by the plate making.

In the ink jet recording systems, ink is usually passed through a filter and discharged from a nozzle, so that abnormal discharge of ink tends to take place by clogging of the nozzle or the filter, change in fluidity of the ink with the lapse of time, or various other factors.

This abnormal discharge of ink occurs not only with an aqueous ink composition, but also with an oil-based ink composition. Various proposals for controlling the abnormal discharge of ink have been made. For example, in order to prevent the abnormal discharge of ink in case of using an oil-based ink composition, it is proposed that the viscosity and specific resistance of the ink composition is controlled as described in JP-A-49-50935, for the ink jet recording method of the electric field controlling system. It is also proposed that the dielectric constant and specific resistance of the solvent used in the ink composition are controlled as described in JP-A-53-29808.

Furthermore, as attempts to prevent clogging of nozzles caused by ordinary oil-based ink for ink jet printer, there are proposed, for example, methods in which dispersion stability of pigment particles is improved (e.g., JP-A-4-25573, JP-A-5-25413 and JP-A-5-65443) and methods in which specific compounds are incorporated into ink compositions (e.g., JP-A-3-79677, JP-A-3-64377, JP-A-4-202386 and JP-A-7-109431).

However, when these ink compositions are used for image formation of lithographic printing plate, the images formed are poor in image strength during printing, and the resulting printing plate cannot have a sufficient press life.

SUMMARY OF THE TNVENTION

An object of the present invention is to provide an oil-based ink for the preparation of a printing plate by an ink jet process which is excellent in dispersion stability, redispersibility, storage stability, image reproducibility and press life.

Another object of the present invention is to provide an oil-based ink for the preparation of a printing plate by an ink jet process which makes it possible to provide many sheets of prints having clear images.

A further object of the present invention is to provide an oil-based ink for the preparation of a printing plate by an ink jet process which does not induce clogging in a discharge part and in the course of ink supply and which makes it possible to conduct stable discharge.

A still further object of the present invention is to provide a method for the preparation of a printing plate by an ink jet process which makes it possible to provide many sheets of prints having clear images.

Other objects of the present invention will become apparent from the following description.

It has been found that these objects of the present invention are accomplished by an oil-based ink for the preparation of a printing plate by an ink jet process comprising dropwise supplying an oil-based ink comprising resin particles dispersed in a nonaqueous carrier liquid having an electric resistance of $10^9$ Ωcm or more and a dielectric constant of 3.5 or less on a lithographic printing plate precursor comprising a water-resistant support and a lithographically printable hydrophilic surface to form an image, wherein the resin particles dispersed are copolymer resin particles obtained by polymerization granulation of a solution comprising (i), (ii) and (iii):

(i) at least one monofunctional monomer (A) which is soluble in a nonaqueous solvent that is at least miscible with the nonaqueous carrier liquid and becomes insoluble in the nonaqueous solvent by polymerization;

(ii) at least one monofunctional macromonomer (MA) having a weight average molecular weight of $2 \times 10^4$ or less in which a polymerizable double bond group represented by the formula (II) shown below is connected with only one terminal of the main chain of a polymer comprising a repeating unit corresponding to a monomer and represented by the formula (I) shown below;

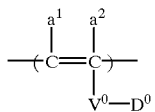
(I)

wherein $V^0$ represents —COO—, —OCO—, —(CH$_2$)$_r$COO—, —(CH$_2$)$_r$OCO—, —O—, —SO$_2$—, —CONHCOO—, —CONHCONH—, —CON(D$^{11}$)—, —SO$_2$N(D$^{11}$)— or a phenylene group, in which $D^{11}$ represents a hydrogen atom or a hydrocarbon group having from 1 to 22 carbon atoms, and r represents an integer of from 1 to 4;

$a^1$ and $a^2$, which may be the same or different, each represents a hydrogen atom, a halogen atom, a cyano group, a hydrocarbon group, —COO—D$^{12}$ or —COO—D$^{12}$ linked through a hydrocarbon group, in which $D^{12}$ represents a hydrogen atom or a hydrocarbon group which may be substituted;

$D^0$ represents a hydrocarbon group having from 8 to 22 carbon atoms or a substituent having a total number of atoms of 8 or more, provided that hydrogen atoms directly attached to a carbon or nitrogen atom are excluded from the number, represented by the following formula (Ia):

—(A$^1$-B$^1$)$_{\overline{m}}$—(A$^2$-B$^2$)$_{\overline{n}}$D$^{21}$ (Ia)

wherein $D^{21}$ represents a hydrogen atom or a hydrocarbon group having from 1 to 22 carbon atoms;

$B^1$ and $B^2$, which may be the same or different, each represents —O—, —CO—, —CO$_2$—, —OCO—, —SO$_2$—, —N(D$^{22}$)—, —CON(D$^{22}$)—, or —N(D$^{22}$)CO—, in which $D^{22}$ has the same meaning as defined for $D^{21}$ above;

$A^1$ and $A^2$, which may be the same or different, each represents at least one group selected from the group consisting of a group represented by the formula (Ib) shown below and a hydrocarbon group having from 1 to 18 carbon atoms, which each may be substituted, provided that, in the case of two or more, it represents a combination of the group represented by the formula (Ib) and/or the hydrocarbon group:

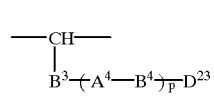
(Ib)

wherein $B^3$ and $B^4$, which may be the same or different, each has the same meaning as defined for $B^1$ or $B^2$ above;

$A^4$ represents a hydrocarbon group having from 1 to 18 carbon atoms which may be substituted;

$D^{23}$ has the same meaning as defined for $D^{21}$ above; and m, n and p, which may be the same or different, each represents an integer of from 0 to 4, provided that m and n are not 0 at the same time;

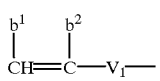
(II)

wherein $V^1$ represents —COO—, —CONHCOO—, —CONHCONH—, —CONH— or a phenylene group; and $b^1$ and $b^2$, which may be the same or different, each has the same meaning as defined for $a^1$ or $a^2$ in the formula (I);

(iii) at least one resin for dispersion stabilization (P) which is soluble in the nonaqueous solvent and comprises a copolymer component represented by the formula (III) shown below:

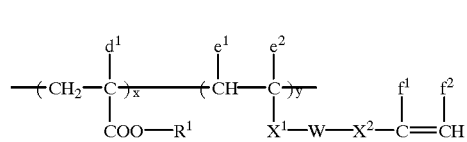
(III)

wherein $R^1$ represents an alkyl group having from 10 to 32 carbon atoms or an alkenyl group having from 10 to 32 carbon atoms;

$d^1$ represents a hydrogen atom or an alkyl group having from 1 to 4 carbon atoms;

$X^1$ and $X^2$, which may be the same or different, each has the same meaning as defined for $V^0$ in the formula (I);

W represents a group connecting $X^1$ and $X^2$ and comprising at least one of a carbon atom and a hetero atom selected from an oxygen atom, a sulfur atom, a silicon atom and a nitrogen atom;

$e^1$, $e^2$, $f^1$ and $f^2$, which may be the same or different, each has the same meaning as defined for $a^1$ or $a^2$ in the formula (I); and x and y each represents a weight ratio of each repeating unit, x represents a number of from 90 to 99, y represents a number of from 10 to 1, or a method for the preparation of a printing plate by an ink jet process comprising dropwise supplying the oil-based ink described above on a lithographic printing plate precursor comprising a water-resistant support and a lithographically printable hydrophilic surface to form an image.

BRIEF DESCRIPTION OF THE ACCOMPANYING DRAWINGS

EXPLANATION OF THE SYMBOLS

Figure 1:
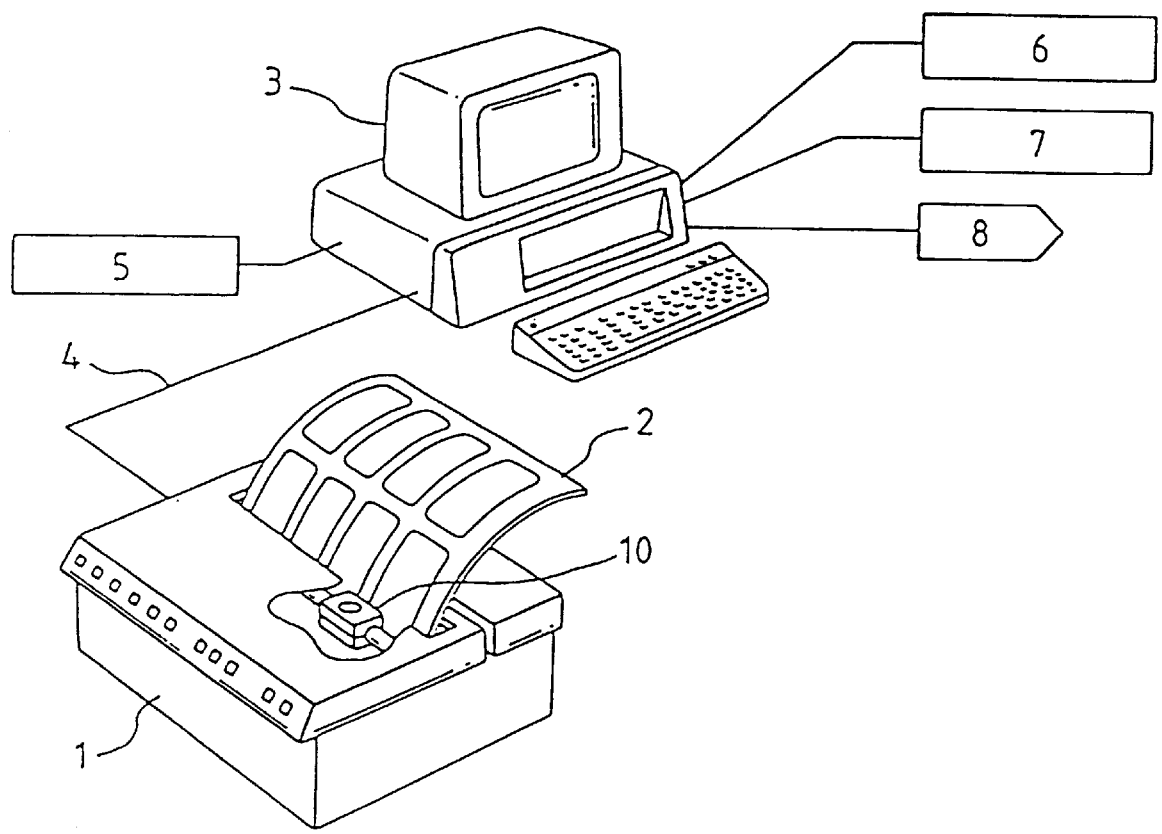
FIG. 1 is a schematic view showing one embodiment of a device system to which the present invention can be applied.

| | |
|---|---|
| 1 | Ink jet recording device |
| 2 | Master |
| 3 | Computer |
| 4 | Bus |
| 5 | Video camera |
| 6 | Hard disk |
| 7 | Floppy disk |
| 8 | Mouse |
| 10 | Head |
| 10a | Discharge slit |
| 10b | Discharge electrode |
| 10c | Counter electrode |
| 11 | Oil-based ink |
| 101 | Upper unit |
| 102 | Lower unit |

DETAILED DESCRIPTION OF THE INVENTION

The present invention is characterized in that the above-described oil-based ink is discharged on a lithographic printing plate precursor by an ink jet process to form an image. The oil-based ink used is excellent in dispersion stability, redispersibility and storage stability, and the resulting lithographic printing plate can provide a large number of prints having clear images.

The present invention also includes the following embodiments.

(1) a method for the preparation of a printing plate by an ink jet process as described above, wherein the oil-based ink is discharged using electrostatic attraction.

(2) a method for the preparation of a printing plate by an ink jet process as described in (1) above, wherein the lithographic printing plate precursor comprises a water-resistant support having provided thereon an image receiving layer having a lithographically printable hydrophilic surface, and the support has a specific electric resistance of $10^{10}$ Ωcm or less at least at an area directly under the image receiving layer.

(3) a method for the preparation of a printing plate by an ink jet process as described in (1) or (2) above, wherein the water-resistant support is a support having a specific electric resistance of $10^{10}$ Ωcm or less as a whole of the support.

(4) a method for the preparation of a printing plate by an ink jet process as described in (1), (2) or (3) above, wherein the resin particles dispersed in the oil-based ink are electroscopic particles positively or negatively charged.

Now, the present invention will be described in more detail below.

The oil-based ink for use in the present invention is described in greater detail below.

The nonaqueous carrier liquid having an electric resistance of $10^9$ Ωcm or more and a dielectric constant of 3.5 or less used in the oil-based ink according to the present invention preferably includes a straight chain or branched chain aliphatic hydrocarbon, an alicyclic hydrocarbon, an aromatic hydrocarbon and halogen-substituted products thereof. Specific examples of the nonaqueous carrier liquid include octane, isooctane, decane, isodecane, decalin, nonane, dodecane, isododecane, cyclohexane, cyclooctane, cyclodecane, benzene, toluene, xylene, mesitylene Isopar E, Isopar G, Isopar H, Isopar L (Isopar: trade name of Exxon Co.), Shellsol 70, Shellsol 71 (Shellsol: trade name of Shell Oil Co.), Amsco OME and Amsco 460 (Amsco: trade name of Spirits Co.), and mixtures thereof. The upper limit value of the electric resistance of the nonaqueous carrier liquid is about $10^{16}$ Ωcm, and the lower limit value of the dielectric constant thereof is about 1.80.

The nonaqueous dispersed resin particles (hereinafter also referred to as "latex particles"), which are the most important constituent in the oil-based ink of the present invention, are obtained by polymerization granulation in a nonaqueous solvent using at least one monofunctional monomer (A) and at least one monofunctional macromonomer (MA) in the presence of a resin for dispersion stabilization (P) which is soluble in the nonaqueous solvent and a random copolymer containing a polymer component having a double bond group copolymerizable with the monofunctional monomer (A).

As the nonaqueous solvent, those miscible with the nonaqueous carrier liquid of the above-described oil-based ink are basically usable.

Specifically, as the solvent used in the preparation of the dispersed resin particles, any solvent may be used as far as it is miscible with the above-described carrier liquid. Preferred examples thereof include a straight chain or branched chain aliphatic hydrocarbon, an alicyclic hydrocarbon, an aromatic hydrocarbon and halogen-substituted products thereof. For example, hexane, octane, isooctane, decane, isodecane, decalin, nonane, dodecane, isododecane, Isopar E, Isopar G, Isopar H, Isopar L, Shellsol 70, Shellsol 71, Amsco OME and Amsco 460 can be used individually or as a mixture thereof.

Examples of a solvent which can be used by mixing together with the nonaqueous solvent include an alcohol (e.g., methyl alcohol, ethyl alcohol, propyl alcohol, butyl alcohol, or a fluorinated alcohol), a ketone (e.g., acetone, methyl ethyl ketone, or cyclohexanone), a carboxylic acid ester (e.g., methyl acetate, ethyl acetate, propyl acetate, butyl acetate, methyl propionate, or ethyl propionate), an ether (e.g., diethyl ether, dipropyl ether, tetrahydrofuran, or dioxane) and a halogenated hydrocarbon (e.g., methylene dichloride, chloroform, carbon tetrachloride, dichloroethane, or methylchloroform).

The solvent used together with the nonaqueous solvent is desirably removed by distillation under heating or a reduced pressure after polymerization granulation. However, even if it is introduced into the oil-based ink as a latex particle dispersion, no problem is encountered as far as the requirements that the electric resistance of the ink is $10^9$ Ωcm or more and that the dielectric constant thereof is 3.5 or less are satisfied.

It is ordinarily preferred to employ a solvent same * as or similar to the carrier liquid as described above in the stage of the preparation of a resin dispersion. * Therefore, a straight chain or branched chain aliphatic hydrocarbon, an alicyclic hydrocarbon, an aromatic hydrocarbon and a halogenated hydrocarbon are preferably used.

The monofunctional monomer (A) for use in the present invention may be any monofunctional monomer as far as it is soluble in a nonaqueous solvent, but insolubilized by polymerization. Specific examples thereof include a monomer represented by the following formula (IV):

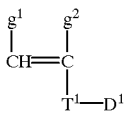

(IV)

wherein $T^1$ represents —COO—, —OCO—, —CH$_2$OCO—, —CH$_2$COO—, —O—, —CONHCOO—, —CONHOCO—, —SO$_2$—, —CON (W$^1$)—, —SO$_2$N (W$^1$)— or a phenylene group (phenylene group being hereinafter described as "—Ph—" sometimes, and including 1,2-, 1,3- and 1,4-phenylene groups), in which $W^1$ represents a hydrogen atom or an aliphatic group having from 1 to 8 carbon atoms which may be substituted (examples of the substituent including a halogen atom, a cyano group, an alkyl group, a hydroxy group, or an alkoxy group having not more than 5 carbon atoms) (e.g., methyl, ethyl, propyl, butyl, 2-chloroethyl, 2-bromoethyl, 2-cyanoethyl, 2-hydroxyethyl, benzyl, chlorobenzyl, methylbenzyl, methoxybenzyl, phenethyl, 3-phenylpropyl, dimethylbenzyl, fluorobenzyl, 2-methoxyethyl, or 3-methoxypropyl);

$D^1$ represents a hydrogen atom or an aliphatic group having from 1 to 6 carbon atoms which may be substituted (e.g., methyl, ethyl, propyl, butyl, 2-chloroethyl, 2,2-dichloroethyl, 2,2,2-trifluoroethyl, 2-bromoethyl, 2-hydroxyethyl, 2-hydroxypropyl, 2,3-dihydroxypropyl, 2-hydroxy-3-chloropropyl, 2-cyanoethyl, 3-cyanopropyl, 2-nitroethyl, 2-methoxyethyl, 2-methanesulfonylethyl, 2-ethoxyethyl, N,N-dimethylaminoethyl, N,N-diethylaminoethyl, trimethoxysilylpropyl, 3-bromopropyl, 4-hydroxybutyl, 2-furfurylethyl, 2-thienylethyl, 2-pyridylethyl, 2-morpholinoethyl, 2-carboxyethyl, 3-carboxypropyl, 4-carboxybutyl, 2-phosphoethyl, 3-sulfopropyl, 4-sulfobutyl, 2-carboxyamidoethyl, 3-sulfoamidopropyl, 2-N-methylcarboxyamidoethyl, cyclopentyl, chlorocyclohexyl, or dichlorohexyl); and $g^1$ and $g^2$, which may be the same or different, each has the same meaning as defined for $a^1$ or $a^2$ in the formula (I).

Specific examples of the monofunctional monomer (A) include a vinyl ester or allyl ester of an aliphatic carboxylic acid having from 1 to 6 carbon atoms such as acetic acid, propionic acid, butyric acid, monochloroacetic acid, or trifluoropropionic acid; an alkyl ester or amide having from 1 to 4 carbon atoms which may be substituted of an unsaturated carboxylic acid such as acrylic acid, methacrylic acid, crotonic acid, itaconic acid or maleic acid (the alkyl group including, for example, methyl, ethyl, propyl, butyl, 2-chloroethyl, 2-bromoethyl, 2-fluoroethyl, trifluoroethyl, 2-hydroxyethyl, 2-cyanoethyl, 2-nitroethyl, 2-methoxyethyl, 2-methanesulfonylethyl, 2-benzenesulfonylethyl, 2-(N,N-dimethylamino)ethyl, 2-(N,N-diethylamino)ethyl, 2-carboxyethyl, 2-phosphoethyl, 4-carboxybutyl, 3-sulfopropyl, 4-sulfobutyl, 3-chloropropyl, 2-hydroxy-3-chloropropyl, 2-furfurylethyl, 2-pyridinylethyl, 2-thienylethyl, trimethoxysilylpropyl and 2-carboxyamidoethyl); a styrene derivative (e.g., styrene, vinyl-toluene, α-methylstyrene, vinylnaphthalene, chlorostyrene, dichlorostyrene, bromostyrene, vinylbenzenecarboxylic acid, vinylbenzenesulfonic acid, chloromethylstyrene, hydroxymethylstyrene, methoxymethylstyrene, N,N-dimethylaminomethylstyrene, vinylbenzenecarboxyamide, or vinylbenzenesulfoamide); an unsaturated carboxylic acid (e.g., acrylic acid, methacrylic acid, crotonic acid, maleic acid or itaconic acid); a cyclic acid anhydride of maleic acid or itaconic acid; an acrylonitrile; a methacrylonitrile; and a heterocyclic compound having a polymerizable double bond group (for example, compounds described in "Polymer Data Handbook, —Fundamental Volume—", edited by Kobunshi Gakkai, pages 175 to 184, Baifukan (1986), specifically, N-vinylpyridine, N-vinylimidazole, N-vinylpyrrolidone, vinyl-thiophene, vinyltetrahydrofuran, vinyloxazoline, vinyl-thiazole, or N-vinylmorpholine).

Two or more kinds of monomers (A) may be used in combination.

The monofunctional macromonomer (MA) for use in the present invention is described in more detail below.

The monofunctional macromonomer (MA) is a macromonomer having a weight average molecular weight of $2\times10^4$ or less in which a polymerizable double bond group represented by the formula (II) is connected with only one terminal of the main chain of a polymer comprising a repeating unit represented by the formula (I).

In the formulas (I) and (II), hydrocarbon groups contained in $a^1$, $a^2$, $V^0$, $D^0$, $b^1$ and $b^2$ each has the number of carbon atoms as shown above (as an unsubstituted hydrocarbon group), and they may be substituted, for example, with a halogen atom, an acyl group, an amino group, a cyano group, an alkoxy group, an aryl group which may be substituted with an alkyl or haloalkyl group, or an amido group.

In the formula (I), $D^{11}$ in the substituent represented by $V^0$ represents a hydrocarbon atom, as well as a hydrogen atom. Preferred examples of the hydrocarbon group include an alkyl group having from 1 to 22 carbon atoms which may be substituted (for example, methyl, ethyl, propyl, butyl, heptyl, hexyl, octyl, nonyl, decyl, dodecyl tridecyl, tetradecyl, hexadecyl, octadecyl, eicosanyl, docosanyl, 2-chloroethyl, 2-bromoethyl, 2-cyanoethyl, 2-methoxycarbonylethyl, 2-methoxyethyl and 3-bromopropyl), an alkenyl group having from 4 to 18 carbon atoms which may be substituted (for example, 2-methyl-1-propenyl, 2-butenyl, 2-pentenyl, 3-methyl-2-pentenyl, 1-pentenyl, 1-hexenyl, 2-hexenyl, 4-methyl-2-hexenyl, decenyl, dodecenyl, tridecenyl, hexadecenyl, octadecenyl and linoleyl), an aralkyl group having from 7 to 12 carbon atoms which may be substituted (for example, benzyl, phenetyl, 3-phenylpropyl, naphthyl- methyl, 2-naphthylethyl, chlorobenzyl, bromobenzyl, methylbenzyl, ethylbenzyl, methoxybenzyl, dimethylbenzyl and dimethoxybenzyl), an alicyclic group having from 5 to 8 carbon atoms which may be substituted (for example, cyclohexyl, 2-cyclohexylethyl and 2-cyclopentylethyl), and an aromatic group having from 6 to 12 carbon atoms which may be substituted (for example, phenyl, naphthyl, tolyl, xylyl, propylphenyl, butylphenyl, octylphenyl, dodecylphenyl, methoxyphenyl, ethoxyphenyl, butoxyphenyl, decyloxyphenyl, chlorophenyl, dichlorophenyl, bromophenyl, cyanophenyl, acetylphenyl, methoxycarbonylphenyl, ethoxycarbonylphenyl, butoxycarbonylphenyl, acetamidophenyl, propionamidophenyl and dodecyloylamidophenyl).

When $V^0$ represents —Ph— (a phenylene group), a benzene ring may have one or more substituents. The substituent includes a halogen atom (for example, chlorine and bromine) and an alkyl group (for example, methyl, ethyl, propyl, butyl, chloromethyl and methoxymethyl).

$a^1$ and $a^2$, which may be the same or different, each preferably represents a hydrogen atom, a halogen atom (for example, chlorine or bromine), a cyano group, an alkyl group having from 1 to 3 carbon atoms (for example, methyl, ethyl or propyl), —COO—$D^{13}$ or —CH$_2$COO—$D^{13}$ (wherein $D^{13}$ represents a hydrogen atom or an alkyl, alkenyl, aralkyl, alicyclic or aryl group having from 1 to 18 carbon atoms, which may be substituted, and specific examples thereof are the same as those described for $D^{11}$ above).

When $D^0$ represents a hydrocarbon group having from 8 to 22 carbon atoms, specific examples thereof are the same as those described for $D^{11}$ above.

The case where $D^0$ represents a substituent having a total number of atoms of 8 or more (excluding hydrogen atoms directly attached to a carbon or nitrogen atom) represented by the formula (Ia) is described in detail below.

$A^1$ and $A^2$ each represents at least one group selected from a group represented by the formula (Ib) and a hydrocarbon group having from 1 to 18 carbon atoms (examples of the hydrocarbon group include an alkyl group, an alkenyl group, an aralkyl group and an alicyclic group, and specific examples thereof include those described for $D^{11}$ above) (in the case of two or more, each represents an appropriate combination of the group of the formula (Ib) and/or the hydrocarbon group).

More specifically, examples of $A^1$ and $A^2$ include any appropriate combinations of atomic groups such as —C($D^{31}$)($D^{32}$)— (in which $D^{32}$ and $D^{32}$ each represents a hydrogen atom, an alkyl group or a halogen atom), —(CH=CH)—, a phenylene group (—Ph—), a cyclohexylene group (cyclohexylene group being hereinafter described as "—C$_6$H$_{10}$—" sometimes, and including 1,2-, 1,3- and 1,4-cyclohexylene groups) and the group represented by the formula (Ib) above.

When $D^0$ represents the substituent having a total number of atoms of 8 or more represented by the formula (Ia), it is preferred that a "connecting main chain" composed of from $V^0$ to $D^{21}$ (namely, $V^0$, $A^1$ $B^1$, $A^2$, $B^2$ and $D^{21}$) in a connecting group of (—$V^0$—(A$^1$–B$^1$)$_m$—(A$^2$–B$^2$)$_n$—$D^{21}$) in the formula (I) has a total number of atoms of 8 or more.

The number of atoms constituting the "connecting main chain" means that, for example, when $V^0$ represents —COO— or —CONH—, the oxo group (=O group) and the hydrogen atom are not contained in the number of atoms, and the carbon atom, the ether type oxygen atom and the nitrogen atom constituting the connecting main chain are contained in the number of atoms (which is different from the total number of atoms defined in $D^0$). Accordingly, with respect to —COO— and —CONH—, the number of atoms is counted as 2. At the same time, when $D^{21}$ represents —C$_9$H$_{19}$, the hydrogen atoms are not contained in the number of atoms, and the carbon atoms are contained therein. In this case, therefore, the number of atoms is counted as 9.

Further, when A and A each has the group represented by the formula (Ib), a group of (—B$^3$—(A$^4$—B$^4$)$_p$—D$^{23}$) is also included in the above-described "connecting main chain".

In the repeating unit corresponding to a monomer and represented by the formula (I), specific examples of the repeating units in the case where $D^0$ represents the substituent represented by the formula (Ia), that is, two or more specific polar groups are contained in the repeating unit are set forth below.

In the following formulas (1) to (19), each symbol donates the following:

$r_1$: —H, —CH$_3$, —Cl or —CN $r_2$: —H or —CH$_3$

λ: an integer of from 2 to 10 p: an integer of from 2 to 6 q: an integer of from 2 to 4 m: an integer of from 1 to 12 n: an integer of from 4 to 18

(1)
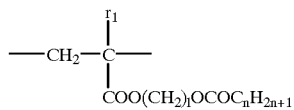

(2)
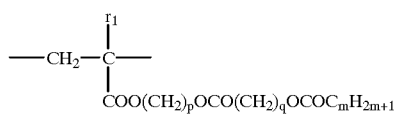

(3)
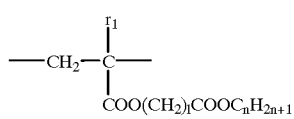

(4)

(5)
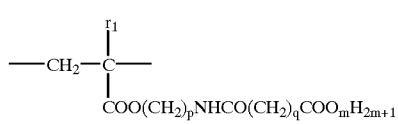

(6)

(7)
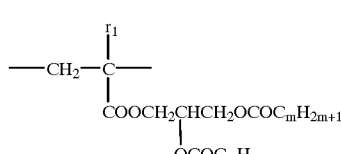

(8)
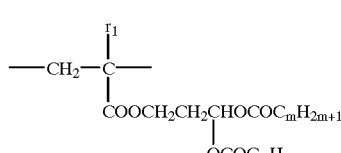

(9)
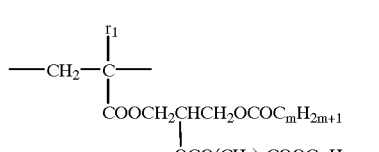

(10)

-continued

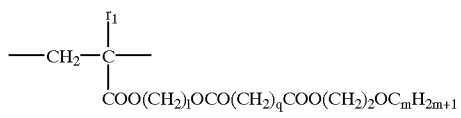
(11)

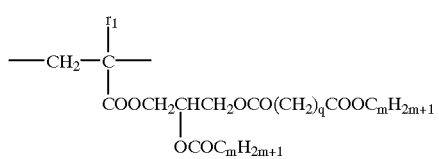
(12)

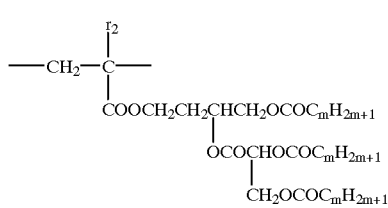
(13)

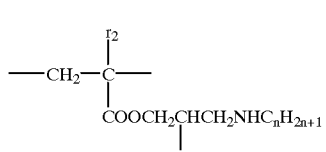
(14)

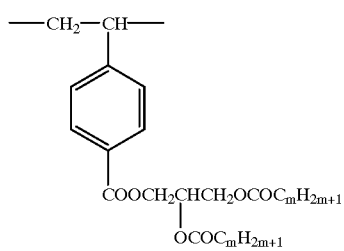
(15)

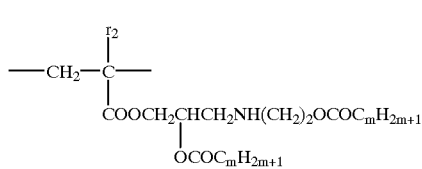
(16)

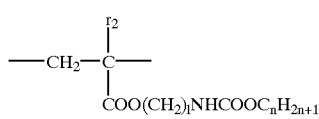
(17)

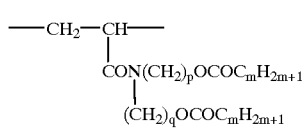
(18)

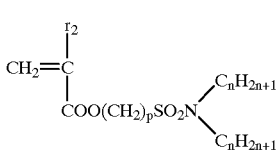
(19)

The macromonomer (MA) used in the present invention has a chemical structure in which a polymerizable double bond group represented by the formula (II) is connected with only one terminal of the main chain of a polymer comprising a repeating unit corresponding to a monomer and represented by the formula (I), directly or through an appropriate connecting group, as described above.

In the formula (II), $V^1$ represents —COO—, —CONHCOO—, —CONHCONH—, —CONH— or a phenylene group.

Specific examples of the phenylene group are the same as those of the phenylene group described for $V^0$ in the formula (I). $b^1$ and $b^2$, which may be the same or different, each has the same meaning as defined for $a^1$ or $a^2$ in the formula (I), and specific examples thereof are the same as those described for $a^1$ and $a^2$.

It is more preferred that either of $b^1$ and $b^2$ in the formula (II) is a hydrogen atom.

A group connecting a component of formula (I) to a component of formula (II) is constituted by any combination of atomic groups of a carbon atom-carbon atom bond (either a single bond or a double bond), a carbon atom-hetero atom bond (examples of the hetero atom include an oxygen atom, a sulfur atom, a nitrogen atom and silicon atom) and a hetero atom-hetero atom bond.

Of the macromonomers (MA) according to the present invention, those represented by the following formula (V) are preferred.

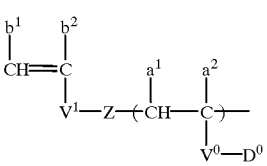
(V)

wherein symbols other than Z have the same meanings as defined for those in the formulas (I) and (II), respectively.

Z represents a single bond, an individual connecting group selected from atomic groups such as —C($D^{41}$)($D^{42}$)— (in which $D^{41}$ and $D^{42}$ each represents a hydrogen atom, a halogen atom (for example, fluorine, chlorine or bromine), a cyano group, a hydroxyl group, an alkyl group (for example, methyl, ethyl or propyl)), —(CH=CH)—, —$C_6H_{10}$—, (a cyclohexylene group), —Ph— (a phenylene group), —O—, —S—, —CO—, —N($D^{43}$)—, —COO—, —SO—, —CON($D^{43}$)—, —SON($D^{43}$)—, —NHCOO—, —NHCONH—, —Si($D^{43}$)($D^{44}$)— (in which $D^{43}$ and $D^{44}$ each represents a hydrogen atom or a hydrocarbon group having the same meaning as defined for $D^{11}$ described above),

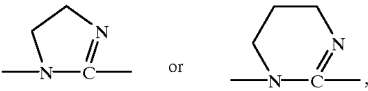

or a connecting group constituted by an appropriate combination of two or more thereof.

In the formula (V), particularly preferred examples of $a^1$, $a^2$, $b^1$, $b^2$, $V^0$ and $V^1$ are shown, respectively, below.

$V^0$ includes —COO—, —OCO—, —O—, —$CH_2$COO— and —$CH_2$OCO—; $V^1$ includes all the groups described above; and $a^1$, $a^2$, $b^1$ and $b^2$ include a hydrogen atom and a methyl group, respectively.

Specific examples of a moiety represented by the formula (II') shown below in the macromonomer of the formula (V) are set forth below, but the present invention should not be construed as being limited thereto.

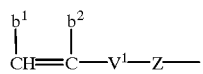
(II')
In the following, b represents —H or —CH$_3$; m1 represents an integer of from 1 to 12; and n1 represents an integer of from 2 to 12.
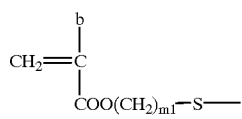
(II'-1)
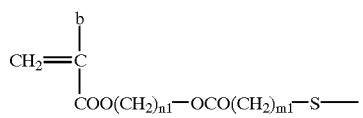
(II'-2)
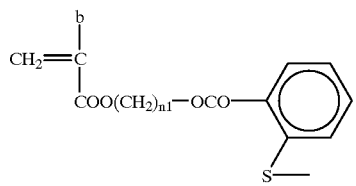
(II'-3)
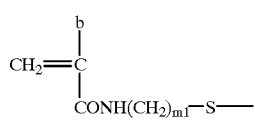
(II'-4)
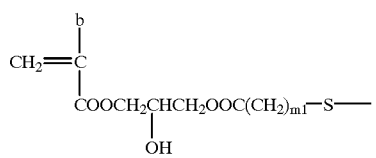
(II'-5)
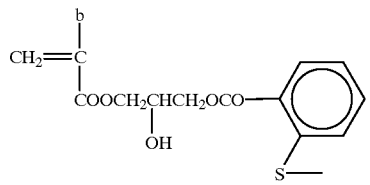
(II'-6)
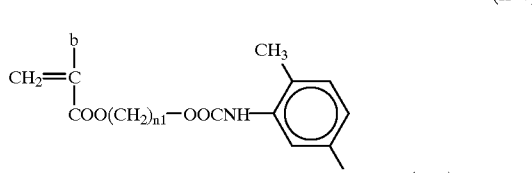
(II'-7)
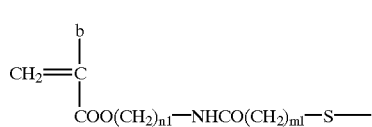
(II'-8)
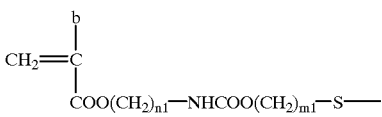
(II'-9)
(II'-10)
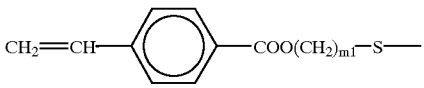
(II'-11)
(II'-12)
(II'-13)
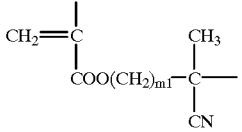
(II'-14)
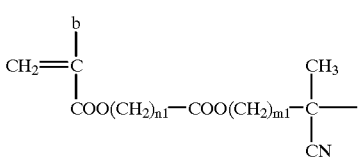
(II'-15)
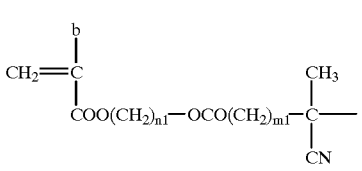
(II'-16)
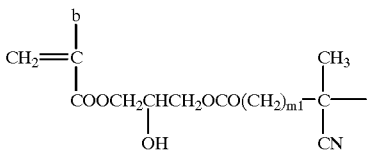
(II'-17)
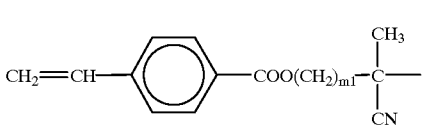
(II'-18)

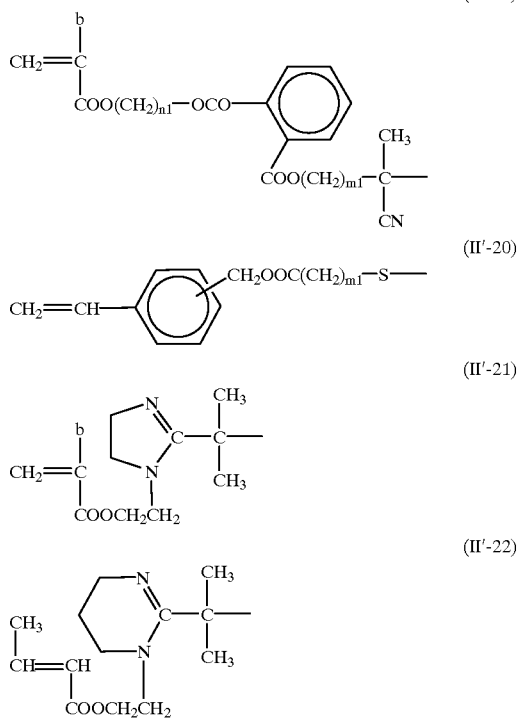

Furthermore, the macromonomer (MA) used in the present invention may contain other repeating unit(s) as copolymerization component(s) together with the repeating unit corresponding to a monomer and represented by the formula (I).

Such other copolymerization components may be any compounds, as long as they are monomers copolymerizable with the monomer corresponding to the repeating unit of the formula (I). Examples thereof include an unsaturated carboxylic acid such as acrylic acid, methacrylic acid, itaconic acid, crotonic acid, maleic acid, vinylacetic acid and 4-pentenoic acid, an ester or amide of these unsaturated carboxylic acids, a vinyl ester or allyl ester of a fatty acid having from 1 to 22 carbon atoms, a vinyl ether, a styrene and styrene derivative and a heterocyclic compound containing a polymerizable double bond group.

Specific examples thereof include the compounds illustrated as examples with respect to the monomers (A) described above, but are not limited thereto.

In the macromonomer (MA), a component of the repeating unit represented by the formula (I) is contained preferably in an amount of 60% by weight or more, and more preferably in an amount of 80% to 100% by weight, of the total amount of the repeating units contained therein.

The macromonomer (MA) of the present invention has preferably a weight average molecular weight of from $1 \times 10^3$ to $2 \times 10^4$, more preferably from $3 \times 10^3$ to $1.5 \times 10^4$.

The macromonomer (MA) of the present invention can be produced by conventionally known synthesis methods. Examples thereof include (1) a method by ionic polymerization in which various reagents are reacted with a terminal of a living polymer obtained by anionic polymerization or cationic polymerization to form a macromonomer; (2) a method by radical polymerization in which various reagents are reacted with an oligomer having a terminal reactive group obtained by radical polymerization using a polymerization initiator and/or chain transfer agent containing a reactive group such as a carboxyl, hydroxy or amino group in its molecule, thereby forming a macromonomer; and (3) a method by polyaddition condensation in which a polymerizable double bond group is introduced into an oligomer obtained by a polyaddition or polycondensation reaction, in the same manner as in the above-described radical polymerization.

Specifically, the macromonomer can be synthesized according to methods described, for example, in P. Dreyfuss & R. P. Quirk, *Encycl. Polym. Sci. Eng.*, 7, 551 (1987), P. F. Rempp & E. Franta, *Adv. Polym. Sci.*, 58, 1 (1984), V. Percec, *Appl. Polym. Sci.*, 285, 95 (1984), R. Asami & M. Takari, *Makromol. Chem. Suppl.*, 12, 163 (1985), P. Rempp et al., *Makromol. Chem. Suppl.*, 8, 3 (1984), Yusuke Kawakami, *Kagaku Kogyo*, 38, 56 (1987), Yuya Yamashita, *Kobunshi*, 31,988 (1982), Shiro Kobayashi, *Kobunshi*, 30, 625 (1981), Toshinobu Higashimura, *Nippon Setchaku Kyokaishi*, 11, 536 (1982), Koichi Ito, *Kobunshi Kako*, 35, 262 (1986) and Kishiro Azuma & Takashi Tsuda, *Kino Zairyo*, 10, 5 (1987), and literature references and patents cited therein.

Examples of the polymerization initiator containing a reactive group in its molecule described above include an azobis compound, such as 4,4'-azobis(4-cyanovaleric acid), 4,4'-azobis(4-cyanovaleric acid chloride), 2,2'-azobis(2-cyanopropanol), 2,2'-azobis(2-cyanopentanol), 2,2'-azobis[2-methyl-N-(2-hydroxyethyl)propionamide], 2,2'-azobis{2-methyl-N-[1,1-bis(hydroxymethyl)ethyl]propionamide}, 2,2'-azobis{2-methyl-N-[1,1-bis(hydroxymethyl)-2-hydroxyethyl]propionamide}, 2,2'-azobis(2-amidinopropane), 2,2'-azobis[2-methyl-N-(2-hydroxyethyl)propionamide], 2,2'-azobis[2-(5-methyl-2-imidazolin-2-yl)propane], 2,2'-azobis[2-(4,5,6,7-tetrahydro-1H-1,3-diazepin-2-yl)propane], 2,2'-azobis[2-(3,4,5,6,-tetrahydropyrimidin-2-yl)propane], 2,2'-azobis[2-(5-hydroxy-3,4,5,6,-tetrahydropyrimidin-2-yl)propane], 2,2'-azobis{2-[1-(2-hydroxyethyl)-2-imidazolin-2-yl]propane}, 2,2'-azobis[N-(2-hydroxyethyl)-2-methylpropionamidine] and 2,2'-azobis[N-(4-aminophenyl)-2-methylpropionamidine].

Further, examples of the chain transfer agent containing a specific reactive group in its molecule include a mercapto compound containing the reactive group or a substituent capable of being derived to the reactive group (for example, thioglycolic acid, thiomalic acid, thiosalicylic acid, 2-mercaptopropionic acid, 3-mercaptopropionic acid, 3-mercaptobutyric acid, N-(2-mercaptopropionyl)glycine, 2-mercaptonicotinic acid, 3-[N-(2-mercaptoethyl)carbamoyl]propionic acid, 3-[N-(2-mercaptoethyl)amino]propionic acid, N-(3-mercaptopropionyl)alanine, 2-mercaptoethanesulfonic acid, 3-mercaptopropanesulfonic acid, 4-mercaptobutanesulfonic acid, 2-mercaptoethanol, 3-mercapto-1,2-propanediol, 1-mercapto-2-propanol, 3-mercapto-2-butanol, mercaptophenol, 2-mercaptoethylamine, 2-mercaptoimidazole and 2-mercapto-3-pyridinol) and an iodinated alkyl compound containing the reactive group or a substituent capable of being derived to the reactive group (for example, iodoacetic acid, iodopropionic acid, 2-iodoethanol, 2-iodoethanesulfonic acid and 3-iodopropanesulfonic acid). Preferred examples thereof include mercapto compounds.

The amounts of the chain transfer agent and the polymerization initiator used are preferably from 0.5 to 20 parts by weight, and more preferably from 1 to 10 parts by weight, based on 100 parts by weight of the total monomers, respectively.

The dispersed resin according to the present invention comprises at least one monomer (A) and at least one monofunctional macromonomer (MA). It is important that the resin synthesized from these monomers is insoluble in a nonaqueous solvent, whereby the desired dispersed resin can be obtained.

More specifically, the monofunctional macromonomer (MA) is used preferably in an amount of from 0.1% to 20% by weight, and more preferably from 0.3% to 15% by weight, based on the monomer (A) to be insolubilized.

Within the ranges as described above, the dispersed resin particles of the oil-based ink of the present invention are excellent in dispersion stability, redispersibility and storage stability. Also, rapid fixing property after the image formation is good, the image formed is well retained during printing and good press life is achieved.

The resin for dispersion stabilization (P) according to the present invention which is employed for making a polymer insoluble in the nonaqueous solvent formed by polymerization of the monomers a stable resin dispersion in the nonaqueous solvent is described in detail below.

The resin for dispersion stabilization (P) according to the present invention is a random copolymer soluble in the nonaqueous solvent containing a copolymer component which works for solubilizing the random copolymer in the nonaqueous solvent (hereinafter referred to component X sometimes) and a copolymer component having a double bond group copolymerizable with the monomer (A) at a terminal of the side chain thereof (hereinafter referred to component Y sometimes) each represented by the formula (III) described above.

Two or more kinds of the component X may be contained in the resin for dispersion stabilization (P) according to the present invention.

In the formula (III), $R^1$ represents an alkyl group having from 10 to 32 carbon atoms or an alkenyl group having from 10 to 32 carbon atoms, each of which may be a straight chain or a branched chain. Specific examples thereof include a decyl group, a dodecyl group, a tridecyl group, a tetradecyl group, a pentadecyl group, a hexadecyl group, an octadecyl group, an eicosanyl group, a docosanyl group, a decenyl group, a dodecenyl group, a tridecenyl group, a hexadecenyl group, an octadecenyl group, an eicosenyl group, docosenyl group, and a linoleyl group.

$d^1$ represents a hydrogen atom or an alkyl group having from 1 to 4 carbon atoms (e.g., methyl, ethyl, propyl, or butyl), and preferably a hydrogen atom or a methyl group.

$X^1$ and $X^2$, which may be the same or different, each has the same meaning as defined for $V^0$ in the formula (I).

W represents a group connecting $X^1$ and $X^2$ and comprising at least one of a carbon atom and a hetero atom selected from an oxygen atom, a sulfur atom, a silicon atom and a nitrogen atom.

The connecting group includes a carbon atom-carbon atom bond (either a single bond or a double bond), a carbon atom-hetero atom bond (the hetero atom including an oxygen atom, a sulfur atom, a nitrogen atom and a silicon atom), a hetero atom-hetero atom bond, a heterocyclic group and an appropriate combination thereof. Specific examples thereof include

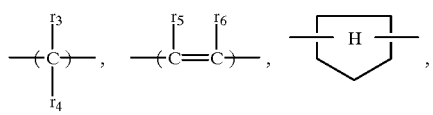

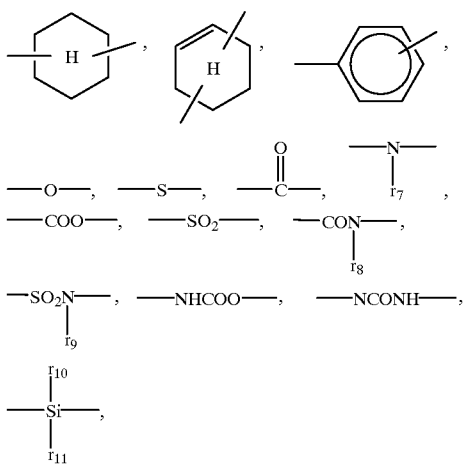

wherein $r_3$, $r_4$, $r_5$ and $r_6$, which may be the same or different, each represents a hydrogen atom, a halogen atom (e.g., fluorine, chlorine, or bromine), a cyano group, a hydroxy group or an alkyl group (e.g., methyl, ethyl, or propyl);

$r_7$, $r_8$ and $r_9$, which may be the same or different, each represents a hydrogen atom or an alkyl group (e.g., methyl, ethyl, propyl, or butyl); and $r_{10}$ and $r_{11}$, which may be the same or different, each represents a hydrogen atom, a hydrocarbon group having from 1 to 8 carbon atoms (e.g., methyl, ethyl, propyl, butyl, pentyl, hexyl, benzyl, phenethyl, phenyl, or tolyl) or $-Or_{12}$ (wherein $r_{12}$ represents a hydrocarbon group having from 1 to 8 carbon atoms (e.g., methyl, ethyl, propyl, butyl, pentyl, hexyl, benzyl, phenethyl, phenyl, or tolyl)).

The heterocyclic group for the connecting group is derived from a heterocyclic ring containing a hetero atom, for example, an oxygen atom, a sulfur atom or a nitrogen atom (e.g., thiophene, pyridine, pyrane, imidazole, benzimidazole, furan, piperidine, pyrazine, pyrrole, or piperazine).

The connecting main chain group represented by $-X^1-W-X^2-$ contained in the component Y of the formula (III) preferably contains a total number of atoms of 8 or more. The number of atoms constituting the connecting chain group means that, for example, when $X^1$ represents $-COO-$ or $-CONH-$, the oxo group ($=O$) and the hydrogen atom are not contained in the number of atoms, and the carbon atom, the ether type oxygen atom and the nitrogen atom constituting the connecting main chain group are contained in the number of atoms. Therefore, in case of $-COO-$ or $-CONH-$, the number of atoms is counted as 2.

Specific examples of the component Y having a polymerizable double bond group are set forth below, but the present invention should not be construed as being limited thereto. In the following formulae (Y-1) to (Y-12), $e^1$ represents $-H$ or $<CH_3$, $e^2$ represents $-H$, $-CH_3$, $-Cl$ or $-CN$, k1 represents an integer of from 4 to 12, k2 represents an integer of from 2 to 6, $L_1$ represents

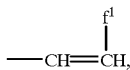

—CH₂CH=CH₂ or

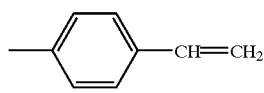

(wherein f¹ represents —H or —CH₃), and L₂ represents

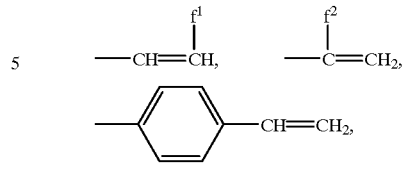

, or —CH₂CH=CH₂ (wherein f² represents —CH₃, —Cl or —CN).

(Y-1)

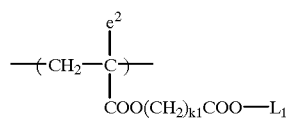

(Y-2)

$$-\!\!\left(\mathrm{CH}-\mathrm{CH}\right)\!\!-$$
$$\underset{\mathrm{CONH(CH_2)_{k1}COO-L_1}}{\overset{e^1}{\phantom{x}}}$$

(Y-3)

—(CH₂—CH)—
COO(CH₂)ₖ₁OCO(CH₂)ₖ₂COO—L₁

(Y-4)

—(CH₂—C(e²))—
COO(CH₂)ₖ₁NHCOO(CH₂)ₖ₂COO—L₂

(Y-5)

—(CH₂—CH)—
COO(CH₂)ₖ₁OOC—L₂

(Y-6)

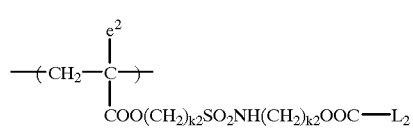

(Y-7)

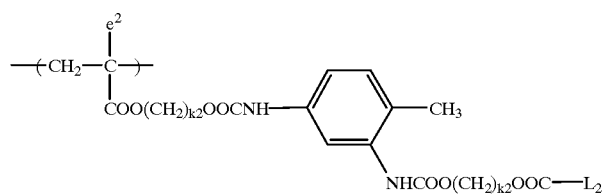

(Y-8)

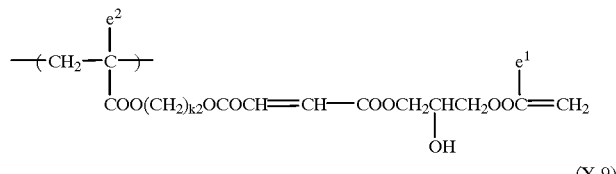

(Y-9)

—(CH₂—C(e²))—
COO(CH₂)ₖ₂SO₂NH(CH₂)ₖ₂OOC—L₂

(Y-10)

—(CH₂—C(e²))—
CONHC(CH₃)(CH₃)CH₂SO₂NH(CH₂)ₖ₂COO—L₁

(Y-11)

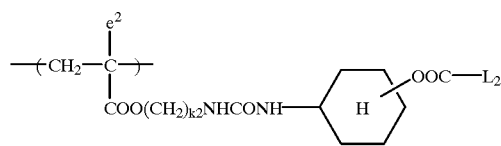

(Y-12)

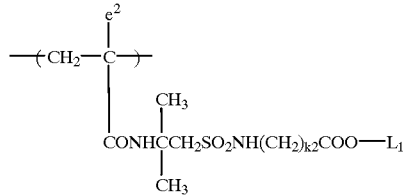

The resin for dispersion stabilization (P) according to the present invention can be easily prepared by means of conventionally known synthesis methods. More specifically, in order to introduce a copolymer component having a polymerizable double bond group (component Y), there is a method in which a polymerization reaction is first conducted using a monomer having a specific reactive group, for example, —OH, —COOH, —SO$_3$H, —NH$_2$, —SH, —PO$_3$H$_2$, —NCO, —NCS, —COCl, —SO$_2$Cl or an epoxy group and a monomer corresponding to the component X in the formula (III), and then a reagent having a polymerizable double bond group is reacted with the resulting copolymer, thereby introducing the polymerizable double bond group into the copolymer by a polymer reaction.

Specifically, the polymerizable double bond group can be introduced according to methods described, for example, in P. Dreyfuss & R. P. Quirk, *Encycl. Polym. Sci. Eng.*, 7, 551 (1987), Yoshiki Nakajyo & Yuya Yamashita, *Senryo to Yakuhin*, 30, 232 (1985), Akira Ueda & Susumu Nagai, *Kagaku to Kogyo*, 60, 57 (1986), P. F. Rempp & E. Franta, *Advance in Polymer Science*, 58, 1 (1984), Koichi Ito, *Kobunshi Kako*, 35, 262 (1986), V. Percec, *Applied Polymer Science*, 2, 97 (1984), and literature references cited therein.

Another method in which a bifunctional monomer having functional groups having different reactivity in a radical polymerization is subjected to copolymerization reaction with a monomer corresponding to the component X to prepare a copolymer represented by the formula (III) without the occurrence of gelation as described in JP-A-60-185962 is also utilized.

In the resin represented by the formula (III), a weight ratio of component X/component Y is from 90/10 to 99/1, preferably from 92/8 to 98/2. In such a range of the weight ratio, the occurrence of gelation in the reaction mixture and the formation of coarse resin particles during the polymerization granulation reaction may be prevented, and the dispersion stability and redispersibility of the dispersed resin particles are excellent.

The resin for dispersion stabilization (P) according to the present invention may contain, as a copolymer component, a repeating unit other than the repeating units corresponding to the components x and Y respectively. The copolymer component to be included may be selected from any monomers copolymerizable with the monomers corresponding to the repeating units shown in the formula (III). Such monomers, however, are preferably employed in a range of not more than 20 parts by weight based on 100 parts by weight of the total copolymer components. When the amount of other monomers exceeds the above-described range, the dispersion stability of the dispersed resin particles may tend to deteriorate.

The resin for dispersion stabilization (P) used in the present invention is soluble in an organic solvent, and specifically, it is preferably dissolved in an amount of at least 5 parts by weight based on 100 parts by weight of toluene at a temperature of 25° C.

The weight average molecular weight (Mw) of the resin for dispersion stabilization (P) according to the present invention is preferably from $2 \times 10^4$ to $10 \times 10^6$, more preferably from $3 \times 10^4$ to $2 \times 10^5$.

The dispersed resin particles used in the present invention are generally prepared by heat polymerization of the resin for dispersion stabilization (P), the monomer (A) and the macromonomer (MA) as described above in the nonaqueous solvent in the presence of a polymerization initiator such as benzoyl peroxide, azobisisobutyronitrile or butyllithium. Specifically, there are (1) a method of adding a polymerization initiator to a mixed solution of the resin for dispersion stabilization (P), the monomer (A) and the macromonomer (MA), (2) a method of adding dropwise the monomer (A) and the macromonomer (MA) together with a polymerization initiator to a solution in which the resin for dispersion stabilization (P) is dissolved, (3) a method of adding a polymerization initiator and the remainders of the monomer (A) and the macromonomer (MA) to a mixed solution containing the total amount of the resin for dispersion stabilization (P) and appropriate parts of the monomer (A) and the macromonomer (MA), and (4) a method of adding a mixed solution of the resin for dispersion stabilization (P), the monomer (A) and the macromonomer (MA) to a nonaqueous solvent together with a polymerization initiator. The dispersed resin particles can be prepared according to any of these methods.

The total amount of the monomer (A) and the macromonomer (MA) is preferably from 10 parts to 100 parts by weight, more preferably from 10 parts to 80 parts by weight, based on 100 parts by weight of the nonaqueous solvent.

The resin for dispersion stabilization (P) is used preferably in an amount of from 3 to 25 parts by weight, more preferably 5 to 20 parts by weight, based on 100 parts by weight of the total amount of the monomers.

The amount of the polymerization initiator is suitably from 0.1% to 10% by weight based on the total amount of monomers used. The polymerization temperature is preferably from about 40° C. to about 180° C., and more preferably from 50° C. to 120° C. The reaction time is preferably from 3 hours to 15 hours.

When the polar solvent described above, such as an alcohol, a ketone, an ether or an ester is used in combination with the nonaqueous solvent used in the reaction, or when unreacted monomers of the monomer (A) to be subjected to polymerization granulation remain, it is preferred that the polar solvent or the unreacted monomers are removed by distillation under heating to temperature equal to or higher than a boiling point of the solvent or the monomers, or under a reduced pressure.

The nonaqueous dispersed resin particles according to the present invention prepared as described above are present as particles which are very fine and uniform in particle size distribution. The average particle size thereof is from 0.15 µm to 1.5 µm, more preferably from 0.2 µm to 1.0 µm. The particle size can be determined using CAPA-500 (trade name, manufactured by Horiba Ltd.).

The weight average molecular weight (Mw) of the dispersed resin according to the present invention is preferably from $5 \times 10^3$ to $1 \times 10^6$, more preferably from $8 \times 10^3$ to $5 \times 10^5$.

As to thermal properties, the dispersed resin according to the present invention has preferably a glass transition point ranging from 15° C. to 80° C. or a softening point ranging from 35° C. to 1200C, preferably a glass transition point ranging from 20° C. to 60° C. or a softening point ranging from 38° C. to 90° C.

The oil-based ink of the present invention is excellent in dispersion stability, redispersibility and storage stability. Also, rapid fixing property after image formation is good, the image formed is well retained during printing, thereby exhibiting good press life.

More specifically, since it has very stable dispersibility, even when it is repeatedly used in a recording device for a long period of time, it is good in dispersibility and easily redispersed, so that contamination due to adhesion of the resin particles to each part of the device is not observed at all.

Furthermore, due to its good fixing property, a strong coating is formed on the hydrophilic outermost surface of the lithographic printing plate precursor by a rapid fixing treatment with heating after ink image formation. This makes it possible to print a large number of sheets (good press life) in offset printing.

The oil-based ink of the present invention having the effects as described above becomes available by a nonaqueous latex of the dispersed resin particles according to the present invention.

In the dispersed resin particles of the present invention, the resin for dispersion stabilization (P) is chemically bonded to the insoluble resin particles at the time of polymerization granulation. The resin (P) which is bonded to the resin particle is soluble in the nonaqueous solvent, and thus it brings about a so-called steric repulsion effect.

In addition, the macromonomer (MA) having the specific substituent is copolymerized with the monomer (A) to be insolubilized at the time of polymerization granulation. The specific substituent moiety contained in the macromonomer (MA) is designed so as to improve the affinity for the nonaqueous solvent, since particles are formed by nonaqueous dispersion polymerization. It is therefore orientated in the interface (surface) area of the particle rather than it gets into the inside of the particle, because of its good solvent affinity for the dispersion medium. It is presumed that as a result, the affinity for the dispersion medium on the particle surface is improved by using the macromonomer (MA) together with the resin for dispersion stabilization (P) to significantly enhance the effect of preventing aggregation of the resin particles.

Consequently, it is believed that aggregation and precipitation of the insoluble resin particles are inhibited, thereby remarkably improving the redispersibility.

It is preferred that the oil-based ink used in the present invention contains a coloring material as a color component for visual inspection of a printing plate after plate making, in addition to the above-described dispersed resin particles.

As the coloring material, any can be used as far as it is a pigment or a dye conventionally employed in an oil-based ink or a liquid developer for electrostatic photography.

The pigments which can be used include those ordinarily employed in the technical field of printing, regardless of inorganic pigments or organic pigments. Specifically, known pigments, for example, carbon black, cadmium red, molybdenum red, chrome yellow, cadmium yellow, Titan Yellow, chromium oxide, pyridian, Titan Cobalt Green, ultramarine blue, Prussian blue, cobalt blue, azo pigments, phthalocyanine pigments, quinacridone pigments, isoindolinone pigments, dioxazine pigments, threne pigments, perylene pigments, perynone pigments, thioindigo pigments, quinophthalone pigments and metal complex pigments can be used without particular limitation.

Preferred examples of the dyes include oil-soluble dyes, for example, azo dyes, metal complex dyes, naphthol dyes, anthraquinone dyes, indigo dyes, carbonium dyes, quinoneimine dyes, xanthene dyes, cyanine dyes, quinoline dyes, nitro dyes, nitroso dyes, benzoquinone dyes, naphthoquinone dyes, phthalocyanine dyes and metallophthalocyanine dyes.

These pigments and dyes may be used individually or in an appropriate combination. They are preferably employed within the range of from 0.01% to 5% by weight based on the whole ink.

The coloring material may be dispersed by itself in the nonaqueous solvent as dispersed particles, separately from the dispersed resin particles, or incorporated into the dispersed resin particles. In order to incorporate the coloring material into the dispersed resin particles, in general, pigments are coated with the resin material of the dispersed resin particles to form resin-coated particles, or the surface portions of dispersed resin particles are colored with dyes to form colored particles.

Specifically, there is a method in which the dispersed resin is dyed with an appropriate dye as described in JP-A-57-48738. Alternatively, there is a method in which the dispersed resin is chemically bonded to a dye as described in JP-A-53-54029, or a method in which a monomer previously containing a dye is used at the time of polymerization granulation to form a dye-containing copolymer as described in JP-B-44-22955 (the term "JP-B" as used herein means an "examined Japanese patent publication").

The dispersed resin particles and the colored particles (or coloring material particles) contained in the oil-based ink of the present invention are preferably electroscopic particles positively or negatively charged.

In order to impart the electroscopicity to the particles, the technology of a liquid developer for electrostatic photography can be appropriately utilized. Specifically, it is carried out using an electroscopic material, for example, a charge control agent and other additives as described, for example, in "Recent Developments and Utilization of Electrophotographic Development Systems and Toner Materials", pages 139 to 148, "Fundamentals and Applications of Electrophotographic Techniques", edited by Denshi Shashin Gakkai, pages 497 to 505 (Corona, 1988), and Yuji Harazaki, "Electrophotography", 16 (No. 2), page 44 (1977).

Suitable compounds are also described, for example, in British Patents 893,429 and 934,038, U.S. Patents 1,122, 397, 3,900,412 and 4,606,989, JP-B-4-51023, JP-B-6-19595, JP-B-6-19596, JP-B-6-23865, JP-A-60-185963 and JP-A-2-13965.

A charge control agent is preferably added in an amount of from 0.001 part to 1.0 part by weight based on 1000 parts by weight of a dispersing medium or a carrier liquid. various additives may be further added if desired, and the upper limit of the total amount of these additives is restricted by the electric resistance of the oil-based ink. Specifically, if the electric resistance of the ink in a state of excluding the dispersed particles therefrom is lower than 109 Ωcm, it may be difficult to obtain continuous gradation images of good quality. It is therefore desired to control the amount of each additive added within the above described value of electric resistance.

The oil-based ink containing the electroscopic resin particles of the present invention is preferably employed in the ink jet recording method of the electric field controlling system in which the ink is discharged using electrostatic attraction, since the discharge of the oil-based ink is easily performed.

Now, the method for the preparation of a lithographic printing plate according to the present invention is described in more detail below.

The lithographic printing plate precursor having a water-resistant support and a lithographically printable hydrophilic surface used in the method of the present invention may be any as far as it provides a hydrophilic surface suitable for lithography.

The surface for receiving the ink image is a hydrophilic surface preferably having a contact angle with water of 5 degrees or less, more preferably 0 degree, to provide prints without the generation of ink stains in the non-image areas.

Supports used for conventional offset printing plates having a hydrophilic surface are employed as they are. For example, an aluminum or aluminum alloy plate whose surface has been rendered hydrophilic or a plate comprising a water-resistant support having provided thereon an aluminum or aluminum alloy layer whose surface has been rendered hydrophilic is used as the lithographic printing plate precursor of the present invention.

A lithographic printing plate precursor comprising a water-resistant support having provided thereon an image receiving layer having a lithographically printable hydrophilic surface is preferably employed in the present invention.

Examples of the water-resistant support include an aluminum plate, a zinc plate, a bimetal plate (e.g., a copper-aluminum plate, a copper-stainless steel plate and a chromium-copper plate), and a trimetal plate (e.g., a chromium-copper-aluminum plate, a chromium-lead-iron plate, and a chromium-copper-stainless steel plate) each preferably having a thickness of from 0.1 to 3 mm, particularly preferably from 0.1 to 1 mm.

Also, paper subjected to water-resistant treatment, paper laminated with a plastic film or a metal foil, and a plastic film each preferably having a thickness of from 80 µm to 200 µm are employed.

It is preferred that the water-resistant support has electroconductivity, more specifically, a specific electric resistance of $10^{10}$ Ωcm or less at least at an area directly under the image receiving layer. The specific electric resistance is more preferably $10^8$ Ωcm or less. The smaller the specific electric resistance, the better.

In order to provide the above described specific electric resistance at least in an area directly under the image receiving layer on a substrate such as paper and a film, for example, a layer comprising an electroconductive filler such as carbon black and a binder is applied thereto, a metal foil is stuck thereon, or a metal is vapor- evaporated thereon.

On the other hand, examples of the support having an electroconductivity as a whole include electroconductive paper impregnated, for example, with sodium chloride, a plastic film having an electroconductive filler such as carbon black incorporated therein, and a metal plate such as an aluminum plate.

In the above-described range of electroconductivity, when ink droplets which have been charged attach to the image-receiving layer in ink jet recording of the electric field controlling type, the charge of the ink droplets is disappeared quickly through earth, and a clear image having no disorder is formed.

In the present invention, the specific electric resistance (also referred to as volume specific electric resistance or electric resistivity, sometimes) was measured by a three-terminal method using a guard electrode according to the method described in JIS K-6911.

The water-resistant support having electroconductivity as a whole used in the present invention is described in more detail below.

For instance, the support is obtained by providing both sides of an electroconductive paper obtained by impregnating sodium chloride into a substrate with a water- resistant electroconductive layer.

In the present invention, the paper used for the substrate include wood pulp paper, synthetic pulp paper and mixed paper of wood pulp and synthetic pulp. The thickness of the paper is preferably from 80 µm to 200 µm.

The electroconductive layer is described in more detail below.

The electroconductive layer is formed by applying a composition containing an electroconductive filler and a binder to both surfaces of the electroconductive paper. The thickness of the electroconductive layer is preferably from 5 µm to 20 µm.

The electroconductive filler includes granulated carbon black, graphite, metal powder (e.g., silver powder, copper powder, nickel powder, brass powder, aluminum powder, copper powder or stainless steel powder), tin oxide powder, aluminum flake, nickel flake, and carbon fiber.

A resin used for the binder can be appropriately selected from various resins. Specifically, examples of the resin include a hydrophobic resin (e.g., acrylic resin, vinyl chloride resin, styrene resin, styrene-butadiene resin, styrene-acrylic resin, urethane resin, vinylidene chloride resin, and vinyl acetate resin) and a hydrophilic resin (e.g., polyvinyl alcohol resin, cellulose derivative, starch and derivatives thereof, polyacrylamide resin, and styrene-maleic anhydride copolymer).

The electroconductive layer can be formed by laminating an electroconductive thin film. Examples of the electroconductive thin film include a metal foil and an electroconductive plastic film. More specifically, the metal foil laminating material includes an aluminum foil, and the electroconductive plastic film laminating material includes a polyethylene resin to which carbon black is incorporated. The aluminum foil may be any of hard type and soft type, and the thickness thereof is preferably from 5 µm to 20 µm.

The polyethylene resin laminate film containing carbon black is preferably obtained using an extrusion laminating method. The method comprises melting polyolefin by heating, forming a film, immediately pressing the film on paper, and cooling it for laminating. Various apparatus are known for conducting the method. The thickness of the laminate layer is preferably from 10 µm to 30 µm. As the support having an electroconductivity as a whole, a plastic film having an electroconductivity and a metal sheet can be used as they are as far as the water-resistivity is satisfied.

The plastic film having an electroconductivity includes a polypropylene or polyester film to which an electroconductive filler such as carbon fiber or carbon black is incorporated. The metal sheet includes an aluminum sheet. The thickness of the substrate is preferably from 80 µm to 200 µm. If it is less than 80 µm, mechanical strength as a printing plate may be insufficient. On the other hand, if it exceeds 200 µm, a handling property such as a transportability in a recording apparatus may tend to decrease.

The support comprising a water-resistant substrate having provided thereon a layer having an electroconductivity is described in more detail below.

As the water-resistant substrate, those described for the water-resistant support above can be employed. In order to form an electroconductive layer on the water- resistant substrate, the methods as described in the formation of the support having an electroconductivity as a whole can be used. Specifically, one surface of the substrate is coated with a layer containing an electroconductive filler and a binder and having a thickness of from 5 µm to 20 µm, or laminated with a metal foil or a plastic film having an electroconductivity.

Furthermore, in addition to the methods described above, for example, a vapor-evaporated film of a metal such as aluminum, tin, palladium or gold may be provided on a plastic film.

According to the methods described above, the water-resistant support having a specific electric resistance of $10^{10}$ Ωcm or less as a whole of the support can be obtained.

As to the support used in the present invention, when an image receiving layer is provided on the support, the smoothness of its surface on the side adjacent to the image receiving layer is adjusted to preferably at least 300 (second/10 ml), more preferably from 900 to 3,000 (second/10 ml)

and particularly preferably from 1,000 to 3,000 (second/10 ml) in the Bekk smoothness.

The Bekk smoothness can be measured with a Bekk smoothness tester. The Bekk smoothness tester is a tester for measuring a time required for a definite amount (10 ml) of air to pass through between a test piece and a glass surface under a reduced pressure, wherein the test piece is pressed to a highly smoothly finished circular glass plate having a hole at its center at a definite pressure (1 kg/cm$^2$).

The image reproducibility and the press life can be still more improved by restricting the smoothness of the surface on the side adjacent to the image receiving layer of the support to the above described value. Such improving effects are obtained even if the image receiving layer having the same surface smoothness is used, and it is considered that the increase in the smoothness of the surface of the support has improved adhesion between the image area and the image receiving layer.

The highly smooth surface of the water-resistant support thus restricted means a surface directly coated with the image receiving layer. Therefore, for example, when the electroconductive layer described above, an under layer or an over-coat layer is provided on the support, it means the surface of the electroconductive layer, the under layer or the over-coat layer.

Thus, the image receiving layer whose surface state is appropriately adjusted as described below is firmly held without being subjected to the influence of unevenness of the surface of the support and as a result, it makes possible to yet more improve the image quality.

The adjustment of the surface smoothness within the above-described range can be made using various known methods. Specifically, such methods include a method of melt-adhering a resin to a surface of a substrate and a method of adjusting the Beck smoothness of a surface of a support by calender reinforcement with a highly smooth hot roller.

Furthermore, in the present invention, the under layer can be provided between the support and the image receiving layer for improving the water resistance and the interlayer adhesive quality as described above, and also a backcoat layer (back surface layer) can be provided on a surface of the support opposite to the image receiving layer for preventing curling. It is preferred that the backcoat layer has a smoothness value ranging from 150 (second/10 ml) to 700 (second/10 ml) in the Bekk smoothness.

By providing such a backcoat layer on the support, when the printing plate obtained is supplied to an offset printing machine, the printing plate can be accurately mounted on the machine without the occurrence of shears or slippage.

When the under layer and the backcoat layer of the support are each adjusted to such a smoothness, it is preferred that the smoothness is controlled by repeating a calender treatment step plural times, for example, by once conducting calender treatment after formation of the under layer and conducting it again after formation of the backcoat layer, or by a combination of the adjustment with respect to compositions of the under layer and the backcoat layer described later, for example, the ratio and the grain size of a pigment, and the adjustment of calender treatment conditions.

The under layer and backcoat layer each is formed by coating and drying or laminating a coating liquid containing a resin, a pigment or the like on a support. The resin can be selected from various resins appropriately. Specifically, they include those described for the above- described electroconductive layer.

Suitable examples of the pigment include clay, kaolin, talc, diatom earth, calcium carbonate, aluminum hydroxide, magnesium hydroxide, titanium oxide and mica. In order to attain the desired smoothness, the pigment is preferably used by appropriately selecting its grain size. For example, a relatively low smoothness is required in the backcoat layer compared with the under layer, so that pigment having relatively a large grain size, specifically, having a grain size of about 0.5 µm to about 10 µm is preferably used. The pigment described above is preferably used at a ratio of 80 parts to 200 parts by weight based on 100 parts by weight of the resin in the backcoat layer. In order to obtain excellent water resistance, the under layer and the backcoat layer effectively contain a water resistance imparting agent such as a melamine resin and a polyamide epichlorohydrin resin. The above described grain size can be measured using a scanning electron microscopic (SEM) photograph. When the grain is not spherical, the size means a diameter determined by converting a projected area of the grains to a circle and obtaining the equivalent circle.

In order to prepare the lithographic printing plate precursor used in the present invention, generally, a solution containing components for the under layer is applied onto one side of the support, followed by drying to form the under layer, if necessary, a solution containing components for the backcoat layer is further applied onto the other side of the support, followed by drying to form the backcoat layer, if necessary, and subsequently, a coating solution containing components for the image receiving layer is applied, followed by drying to form the image receiving layer. The coating amount of the backcoat layer is suitably from 1 g/m$^2$ to 30 g/m$^2$, and preferably from 6 g/m$^2$ to 20 g/m$^2$.

More preferably, the thickness of the water-resistant support provided with the under layer and/or the backcoat layer ranges suitably from 90 µm to 130 µm, and preferably from 100 µm to 120 µm.

The image receiving layer is provided on the water-resistant support, and the thickness thereof is preferably from 5 µm to 50 µm.

The image receiving layer comprises, for example, a water-soluble binder, an inorganic pigment and a water-resistance imparting agent as its main component. The binder includes a water-soluble resin, for example, PVA, modified PVA (e.g., carboxy modified PVA), starch and a derivative thereof, CMC, hydroxyethyl cellulose, casein, gelatin, polyvinylpyrrolidone, a copolymer of vinyl acetate and crotonic acid, and a copolymer of styrene and maleic acid.

Examples of the water resistance imparting agent includes glyoxal, a primary condensation product of an aminoplasts such as a melamine formaldehyde resin or urea formaldehyde resin, a modified polyamide resin (e.g., methylol polyamide resin), and a polyamide-polyamine-epichlorohydrin resin. Examples of the inorganic pigment include kaolin, clay, calcium carbonate, silica, titanium oxide, zinc oxide, barium sulfate, and alumina. Among these, silica is preferred.

In addition, the image receiving layer may contain a crosslinking catalyst such as ammonium chloride or a silane coupling agent.

In the present invention, the smoothness of the surface of the image receiving layer is preferably 50 (second/10 ml) or more, and more preferably 80 (second/10 ml) or more, in the Bekk smoothness.

Defects and blurs of ink images which may be formed owing to the unevenness of the image receiving layer are preferably inhibited at the Bekk smoothness of 50 or more.

A method for forming an image on the lithographic printing plate precursor as described above (hereinafter also referred to as a "master") is described below. One example of a device system suitable for performing such a method is shown in FIG. 1.

The device system shown in FIG. 1 comprises an ink jet recording device 1 using an oil-based ink.

As shown in FIG. 1, pattern information of images (figures and letters) to be formed on a master 2 is first supplied from an information supply source such as a computer 3 to the ink jet recording device 1 using oil-based ink through a transmittal means such as a bus 4. A head for ink jet recording 10 of the recording device 1 stores oil-based ink therein, and sprays fine droplets of the ink on the master 2 according to the above-described information, when the master 2 passes through in the recording device 1, whereby the ink adheres to the master 2 in accordance with the above-described pattern.

Thus, the image formation on the master 2 is completed to obtain a printing plate.

Figure 2:
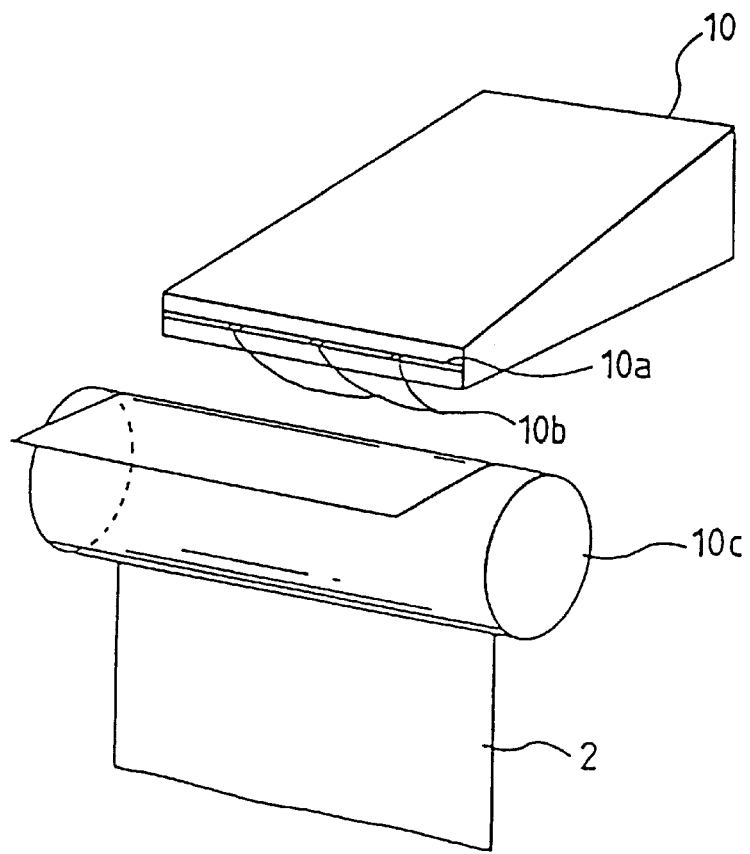
FIG. 2 is a schematic view showing the main part of an ink jet recording device which can be used in the present invention.
Figure 3:
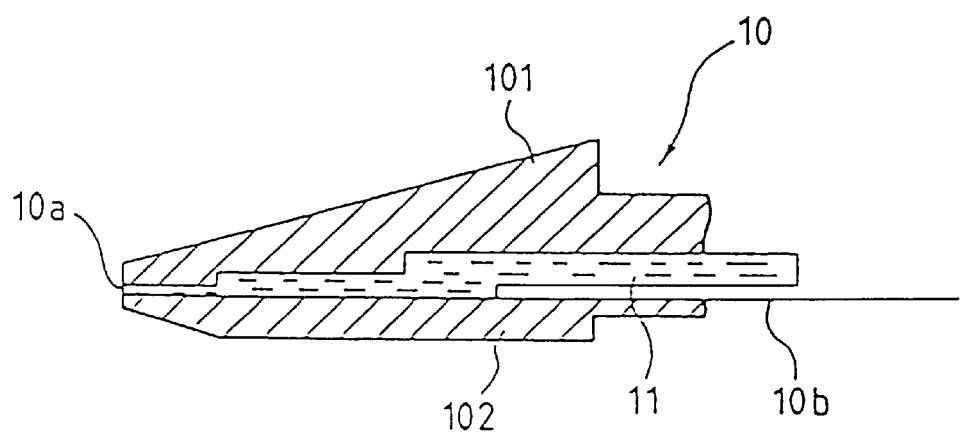
FIG. 3 is a partially sectional view showing a head of the ink jet recording device which can be used in the present invention.

Components of the ink jet recording device as shown in the device system of FIG. 1 are shown in FIG. 2 and FIG. 3, respectively. In FIG. 2 and FIG. 3, members common to the members in FIG. 1 are designated using the same symbols, respectively. FIG. 2 is a schematic view showing the main part of such an ink jet recording device, and FIG. 3 is a sectional view showing a part of the head.

The head 10 attached to the ink jet recording device has a slit between an upper unit 101 and a lower unit 102, a leading edge thereof forms a discharge slit 10a, a discharge electrode 10b is arranged in the slit, and the inside of the slit is filled with oil-based ink 11, as shown in FIG. 2 and FIG. 3.

In the head 10, voltage is applied to the discharge electrode 10b according to a digital signal of pattern information of image. As shown in FIG. 2, a counter electrode 10c is provided opposite to the discharge electrode 10b, and the master 2 is placed on the counter electrode 10c. The application of voltage forms a circuit between the discharge electrode 10b and the counter electrode 10c, and the oil-based ink 11 is discharged from the discharge slit 10a of the head 10, thereby forming images on the master 2 placed on the counter electrode 10c.

It is preferred that the width of the discharge electrode 10b is as narrow as possible in its leading edge, for forming images of high quality by the ink jet process.

For example, the head of FIG. 3 is filled with the oil-based ink, the discharge electrode 10b whose leading edge has a width of 20 μm is used, the distance between the discharge electrode 10b and the counter electrode 10c is adjusted to 1.5 mm, and a voltage of 3 KV is applied between these electrodes for 0.1 millisecond, whereby print of a 40 μm-dot can be formed on the master 2.

The oil-based ink according to the present invention is excellent in dispersion stability, redispersibility, storage stability, image reproducibility and printing durability (i.e., press life). The method for the preparation of a printing plate according to the present invention comprising image formation by an ink jet process using the oil-based ink according to the present invention provides a printing plate having excellent image reproducibility and printing durability in a simple manner.

The present invention will be described in greater detail with reference to the following examples, but the present invention should not be construed as being limited thereto.

SYNTHESIS EXAMPLE 1 OF MACROMONOMER (MA)

Synthesis of Macromonomer (MA-1)

A mixed solution of 100 g of octadecyl methacrylate, 2 g of 3-mercaptopropionic acid and 200 g of toluene was heated to a temperature of 70° C. with stirring under nitrogen gas stream. To the solution, 1.0 g of 2,2'-azobis (isobutyronitrile) (abbreviated as AIBN) was added to conduct a reaction for 4 hours, 0.5 g of AIBN was further added to conduct the reaction for 3 hours, and 0.3 g of AIBN was still further added to conduct the reaction for 3 hours. Then, 8 g of glycidyl methacrylate, 1.0 g of N,N-dimethyldodecylamine and 0.5 g of tert-butylhydroquinone were added to the reaction solution, and stirred at a temperature of 100° C. for 10 hours. After cooling, the reaction solution was reprecipitated in 2 liters of methanol to obtain 82 g of white powder. A weight average molecular weight (Mw) of the polymer was $1 \times 10^4$. The weight average molecular weight (Mw) was measured by GPC method and calculated in terms of polystyrene (hereinafter the same).

Macromonomer (MA-1)

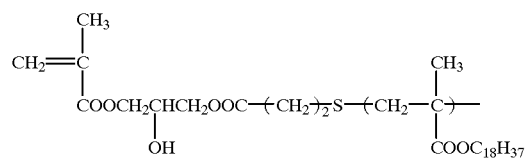

SYNTHESIS EXAMPLES 2 to 11 OF MACROMONOMER (MA)

Synthesis of Macromonomers (MA-2) to (MA-11)

Macromonomers (MA-2) to (MA-11) were synthesized in the same manner as in Synthesis Example 1 of Macromonomer (MA) with the exception that only octadecyl methacrylate is replaced by compounds corresponding to the repeating units shown in Table 1 below, respectively. The weight average molecular weight (Mw) of each macromonomer obtained was in a range of from $9 \times 10^3$ to $1 \times 10^4$.

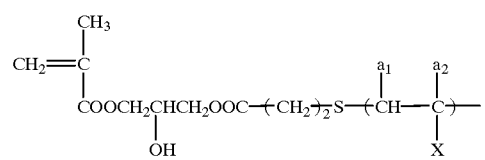

TABLE 1

| Synthesis Example of Macromonomer (MA) | Macromonomer (MA) | $a_1/a_2$ | X |
|---|---|---|---|
| 2 | MA-2 | —H/—CH₃ | COOC₁₂H₂₅ |
| 3 | MA-3 | —H/—CH₃ | COOC₁₃H₂₇ |
| 4 | MA-4 | —H/—CH₃ | COOC₁₈H₃₇ |

TABLE 1-continued

| Synthesis Example of Macromonomer (MA) | Macromonomer (MA) | $a_1/a_2$ | X |
|---|---|---|---|
| 5 | MA-5 | —H/—H | $\underset{COOC_{18}H_{37}}{\mid}$ |
| 6 | MA-6 | —H/—CH$_3$ | —(CH$_2$)$_2$OCO(CH$_2$)$_2$COOC$_2$H$_5$ |
| 7 | MA-7 | —H/—CH$_3$ | —(CH$_2$)$_2$OCO(CH$_2$)$_2$COOCH$_3$ |
| 8 | MA-8 | —H/—H | —(CH$_2$)$_2$OCOCH=CH—COOC$_5$H$_{11}$ |
| 9 | MA-9 | —H/—H | —CH$_2$CHCH$_2$OCOC$_6$H$_{13}$<br>$\mid$<br>OCOC$_6$H$_{13}$ |
| 10 | MA-10 | —H/—CH$_3$ | —CH$_2$CHCH$_2$OCOC$_5$H$_{11}$<br>$\mid$<br>OCOCH$_3$ |
| 11 | MA-11 | —H/—H | —(CH$_2$)$_2$OCO(CH$_2$)$_2$SO$_2$C$_8$H$_{17}$ |

SYNTHESIS EXAMPLE 12 OF MACROMONOMER (MA)

Synthesis of Macromonomer (MA-12)

A mixed solution of 100 g of tetradecyl methacrylate, 2 g of thioethanol and 200 g of toluene was heated to a temperature of 70° C. with stirring under nitrogen gas stream. To the solution, 1.0 g of AIBN was added to conduct a reaction for 4 hours, 0.5 g of AIBN was further added to conduct the reaction for 3 hours, and 0.3 g of AIBN was still further added to conduct the reaction for 3 hours. The reaction solution was cooled to room temperature, and 8 g of 2-carboxyethyl acrylate was added thereto. Then, a mixed solution of 12.7 g of dicyclohexylcarbodiimide (abbreviated as DCC) and 60 g of methylene chloride was added dropwise thereto over a period of 1 hour. Then, 1.0 g of tert-butylhydroquinone was added, followed by stirring for 4 hours.

The crystals thus-deposited were removed by filtration, and the filtrate was reprecipitated in 2 liters of methanol. The precipitated oily product was collected by decantation, dissolved in 150 ml of methylene chloride, and reprecipitated again in one liter of methanol. The oily product was collected and dried under a reduced pressure to obtain a polymer having the Mw of $8 \times 10^3$ in a yield of 60 g.

Macromonomer (MA-12)

$$CH_2=CH \qquad\qquad CH_3$$
$$\mid \qquad\qquad\qquad\qquad\qquad\qquad \mid$$
$$COO(CH_2)_2COO(CH_2)_2S\text{---}(CH_2\text{---}C)\text{---}$$
$$\qquad\qquad\qquad\qquad\qquad\qquad\qquad \mid$$
$$\qquad\qquad\qquad\qquad\qquad\qquad\qquad COOC_{14}H_{29}$$

SYNTHESIS EXAMPLE 13 to 15 OF MACROMONOMER (MA)

Synthesis of Macromonomer (MA-13) to (MA-15)

Macromonomers (MA-13) to (MA-15) shown in Table 2 below were synthesized in the same manner as in Synthesis Example 12 of Macromonomer (MA) with the exception that a methacrylate monomer (corresponding to tetradecyl methacrylate) and an unsaturated carboxylic acid (corresponding to 2-carboxyethyl acrylate) were employed, respectively. The weight average molecular weight of each macromonomer obtained in a yield of 60 to 70 g was in a range of from $7 \times 10^3$ to $9 \times 10^3$.

TABLE 2

| Synthesis Example of Macromonomer (MA) | Macromonomer (MA) | Chemical Structure of Macromonomer (MA) |
|---|---|---|
| 13 | MA-13 | 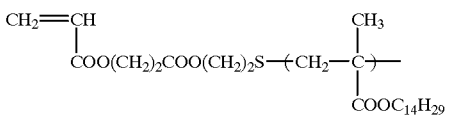 |
| 14 | MA-14 | $CH_2=C(CN)\text{---}COO(CH_2)_2S\text{---}[(CH_2\text{---}C(CH_3)(COOC_{12}H_{25}))_{50}(CH_2\text{---}CH(COOC_{18}H_{37}))_{50}]$ |

TABLE 2-continued

| Synthesis Example of Macro-monomer (MA) | Macro-monomer (MA) | Chemical Structure of Macromonomer (MA) |
|---|---|---|
| 15 | MA-15 | $CH_2=CH-C_6H_4-COO(CH_2)_2S-(CH_2-C(CH_3)(COO(CH_2)_2OCOC_{10}H_{21}))-$ |

SYNTHESIS EXAMPLE 16 OF MACROMONOMER (MA)

Synthesis of Macromonomer (MA-16)

A mixed solution of 100 g of 2,3-dihexanoyloxypropyl methacrylate, 150 g of tetrahydrofuran and 50 g of isopropyl alcohol was heated to a temperature of 75° C. with stirring under nitrogen gas stream. To the solution, 5.0 g of 4,4'-azobis(4-cyanovaleric acid) (abbreviated as ACV) was added to conduct a reaction for 5 hours, and then 1.0 g of ACV was further added to conduct the reaction for 4 hours. After cooling, the reaction solution was reprecipitated in 1.5 liters of methanol, and the oily product was collected by decantation and dried under a reduced pressure. The yield was 85 g.

A mixture of 50 g of the resulting oily product, 15 g of glycidyl methacrylate, 1.0 g of N,N-dimethyldodecylamine, 1.0 g of 2,2'-methylenebis(6-tert-butyl-p-cresol) and 100 g of toluene was stirred at a temperature of 100° C. for 15 hours. After cooling, the reaction solution was reprecipitated in one liter of petroleum ether to obtain 63 g of white powder. The weight average molecular weight thereof was $7 \times 10^3$.

Macromonomer (MA-16)

mixture, and the mixture was heated to a temperature of 80° C. and subjected to a reaction for 4 hours.

After cooling the reaction mixture to a temperature of 25° C., 6 g of allyl alcohol was added with stirring and then a mixed solution of 10 g of dicyclohexylcarbodiimide (abbreviated as DCC), 0.1 g of 4-(N,N-diethylamino) pyridine and 30 g of methylene chloride was dropwise added thereto over a period of one hour, followed by reacting for 3 hours.

To the reaction mixture was added 10 g of a 80% aqueous solution of formic acid and the resulting mixture was stirred for one hour. After removing the insoluble substance by filtration, the filtrate was reprecipitated in 2.5 liters of methanol. The resulting precipitate was collected by filtration and dissolved in 200 g of toluene. After removing the insoluble substance by filtration, the filtrate was reprecipitated in one liter of methanol. The resulting precipitate was collected by filtration and dried to obtain 70 g of the desired copolymer. The weight average molecular weight (Mw) thereof was $5 \times 10^4$.

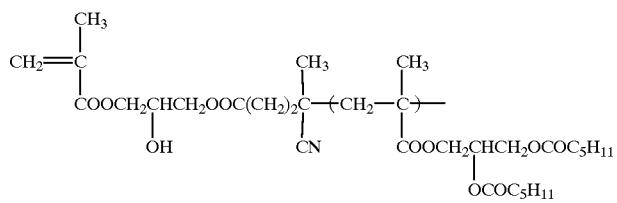

SYNTHESIS EXAMPLE 1 OF RESIN FOR DISPERSION STABITTIZATION (P)

Synthesis of Resin for Dispersion Stabilization (P-1)

A mixed solution of 96 g of octadecyl methacrylate, 4 g of 4-(2-methacryloyloxyethyloxycarbonyl)butyric acid and 200 g of toluene was heated to a temperature of 75° C. under nitrogen gas stream with stirring. To the solution was added 1.5 g of 2,2'-azobis(isobutyronitrile) (abbreviated as AIBN) as a polymerization initiator, followed by reacting for 4 hours. Then, 0.8 g of AIBN was added to the reaction Resin (P-1)

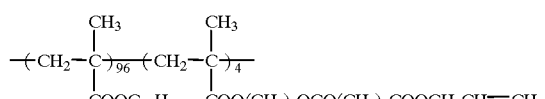

SYNTHESIS EXAMPLE 2 OF RESIN FOR DISPERSION STABILIZATION (P)

Synthesis of Resin for Dispersion Stabilization (P-2)

A mixed solution of 50 g of dodecyl methacrylate, 45 g of octadecyl acrylate, 5 g of glycidyl methacrylate and 200 g of toluene was heated to a temperature of 75° C. under nitrogen gas stream with stirring. To the solution was added 1.8 g of AIBN, followed by reacting for 4 hours. Then, 0.5 g of AIBN was added to the reaction mixture, followed by reacting for 3 hours, and further 0.3 g of AIBN was added thereto, followed by reacting for 3 hours.

To the reaction mixture were added 6 g of 3-acryloyloxypropionic acid, 1.0 g of N,N-dimethyldodecylamine and 0.5 g of tert-butylhydroquinone, and the mixture was stirred at a temperature of 100° C. for 10 hours. After cooling the reaction mixture, it was reprecipitated in 2 liters of methanol to obtain 82 g of the desired copolymer as white powder. The weight average molecular weight (Mw) thereof was $4 \times 10^4$.

Resin (P-2)

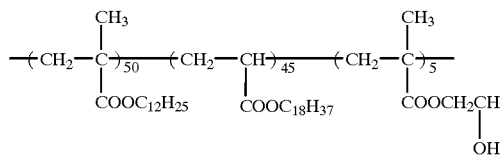

SYNTHESIS EXAMPLE 3 OF RESIN FOR DISPERSION STABILIZATION (P)

Synthesis of Resin for Dispersion Stabilization (P-3)

A mixed solution of 96 g of tridecyl methacrylate, 4 g of 11-methacrylamidoundecanoic acid and 200 g of toluene was heated to a temperature of 75° C. under nitrogen gas stream with stirring. To the solution was added 1.0 g of AIBN, followed by reacting for 4 hours. Then, 0.5 g of AIBN was added to the reaction mixture, followed by reacting for 3 hours, and further 0.3 g of AIBN was added thereto, followed by reacting for 3 hours.

After cooling the reaction mixture to a temperature of 40° C., 0.2 g of hydroquinone, then 6.9 g of vinyl acetate and 0.05 g of mercury acetate were added thereto, followed by reacting for 2 hours. The temperature thereof was again raised to 70° C., $7.5 \times 10^{-3}$ ml of 100% of sulfuric acid was added thereto and the mixture was reacted for 6 hours. To the reaction mixture was added 0.04 g of sodium acetate trihydrate, the mixture was thoroughly stirred and poured into 4.5 liters of methanol for reprecipitation and purification to obtain 75 g of the desired copolymer as slightly brownish viscous solid. The weight average molecular weight (Mw) thereof was $5.3 \times 10^4$.

Resin (P-3)

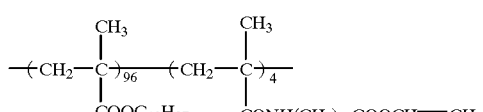

SYNTHESIS EXAMPLE 4 OF RESIN FOR DISPERSION STABILIZATION (P)

Synthesis of Resin for Dispersion Stabilization (P-4)

A mixed solution of 97 g of hexadecyl methacrylate, 3 g of Monomer (Y-1) having the structure shown below and 400 g of isodecane was heated to a temperature of 70° C. under nitrogen gas stream with stirring. To the solution was added 1.5 g of 2,2'-azobis(isovaleronitrile) (abbreviated as AIVN) as a polymerization initiator with stirring, followed by reacting for 4 hours. Then, 0.8 g of AIVN was added to the reaction mixture, followed by reacting for 3 hours, and further 0.5 g of AIVN was added thereto, followed by reacting for 3 hours. The solid content of the resulting reaction mixture was 19.9% by weight. The weight average molecular weight (Mw) of the copolymer obtained was $4 > 10^4$.

Monomer (Y-1)

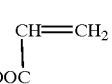

Resin (P-4)

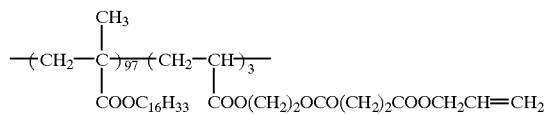

PREPARATION EXAMPLE 1 OF RESIN PARTICLE

Preparation of Resin Particle (L-1)

A mixed solution of 10 g of Resin for Dispersion Stabilization (P-1), 100 g of vinyl acetate, 4 g of Macromonomer (MA-1) and 342 g of Isopar H was heated to a temperature of 70° C. under nitrogen gas stream with stirring. To the solution was added 1.5 g of 2,2'-azobis(isovaleronitrile) (abbreviated as AIVN) as a polymerization initiator, followed by reacting for 3 hours and 0.8 g of AIVN was further added, followed by reacting for 2 hours. Then, 0.5 g of AIBN was added to the reaction mixture and the mixture was heated to a temperature of 80° C., followed by reacting for 3 hours. The temperature of the reaction mixture was raised to 100° C., followed by stirring for 2 hours under a reduced pressure of 20 mmHg, thereby distilling off the unreacted monomers. After cooling the reaction mixture, it was passed through a nylon cloth of 200 mesh. The resulting white dispersion was a latex having a polymerization rate of 98% and an average particle diameter of 0.40 μm. The particle diameter was measured by CAPA-500 manufactured by Horiba Ltd. (hereinafter the same).

A part of the above-described white dispersion was centrifuged at a rotation of $1 \times 10^4$ r.p.m. for one hour and the resin particles precipitated were collected and dried. The weight average molecular weight (Mw) of the resin particles was 3×105. A glass transition point (Tg) thereof was 38° C.

PREPARATION EXAMPLE 2 OF RESIN PARTTCT-E

Preparation of Resin Particle (L-2)

A mixed solution of 12 g of Resin for Dispersion Stabilization (P-2) and 177 g of Isopar H was heated to a temperature of 60° C. under nitrogen gas stream with stirring. To the solution was added dropwise a mixed solution of 40 g of methyl methacrylate, 60 g of methyl acrylate, 3 g of Macromonomer (MA-5), 200 g of Isopar G and 1.0 g of AIVN over a period of 2 hours, followed by stirring for 2 hours. Then, 0.5 g of AIVN was added to the reaction mixture and the mixture was heated to a temperature of 75° C., followed by reacting for 3 hours. After cooling the reaction mixture, it was passed through a nylon cloth of 200 mesh. The resulting white dispersion was a latex having a polymerization rate of 99% and an average particle diameter of 0.38 μm. The weight average molecular weight (Mw) of the resin particles was $1 \times 10^5$. A glass transition point (Tg) thereof was 38° C.

PREPARATION EXAMPLES 3 TO 6 OF RESIN PARTICLE

Preparation of Resin Particles (L-3) To (L-6)

Resin Particles (L-3) to (L-6) were prepared in the same manner as in Preparation Example 1 of Resin Particle expect that 11 g of Resin for Dispersion Stabilization (P-4) was used in plane of 10 g of Resin for Dispersion Stabilization (P-1), and Monomer (A) and Macromonomer (MA) shown in Table 3 below were used in place of vinyl acetate and Macromonomer (MA-1), respectively.

A polymerization rate of each of the resulting resin particles was in a range of from 93% to 98%, and an average particle diameter thereof was in a range of from 0.35 μm to 0.04 μm with good monodispersity. The Mw of each of the resin particles was in a range of from $8 \times 10^4$ to $1-10^5$.

TABLE 3

| Preparation Example | Resin Particle | Monomer (A) | | Macromonomer (MA) | | Tg of Resin Particle |
|---|---|---|---|---|---|---|
| 3 | L-3 | Vinyl Acetate<br>Vinyl Propionate | 80 g<br>20 g | MA-1 | 3 g | 32° C. |
| 4 | L-4 | Vinyl Acetate<br>Crotonic Acid | 95 g<br>5 g | MA-16 | 4 g | 43° C. |
| 5 | L-5 | Vinyl Acetate<br>N-Vinylpyrrolidone | 90 g<br>10 g | MA-6 | 4 g | 45° C. |
| 6 | L-6 | Vinyl Acetate<br>Vinylacetic Acid<br>Vinyl Butyrate | 82 g<br>8 g<br>10 g | MA-9 | 5 g | 35° C. |

PREPARATION EXAMPLES 7 TO 15 OF RESTN PARTICLE

Preparation of Resin Particles (L-7) to (L-15)

Resin Particles (L-7) to (L-15) were prepared in the same manner as in Preparation Example 2 of Resin Particle expect that 11 g of Resin for Dispersion Stabilization (P-3) was used in pace of 12 g of Resin for Dispersion Stabilization (P-2), and the compounds shown in Table 4 below were used in place of Monomer (A) (i.e., methyl methacrylate and methyl acrylate), and Macromonomer (MA-5), respectively.

A polymerization rate of each of the resulting resin particles was in a range of from 95% to 99% and an average particle diameter thereof was in a range of from 0.38 μm to 0.45 μm with good monodispersity. The Mw of each of the resin particles was in a range of from $8 \times 10^4$ to $2 \times 10^5$.

TABLE 4

| Preparation Example | Resin Particle | Monomer (A) | | Macromonomer (MA) | | Tg of Resin Particle |
|---|---|---|---|---|---|---|
| 7 | L-7 | Methyl Methacrylate<br>Ethyl Acrylate | 50 g<br>50 g | MA-2 | 4.5 g | 27° C. |
| 8 | L-8 | Methyl Methacrylate<br>Methyl Acrylate | 25 g<br>75 g | MA-4 | 4 g | 26° C. |
| 9 | L-9 | Methyl Methacrylate<br>Methyl Acrylate | 25 g<br>75 g | MA-12 | 3 g | 26° C. |
| 10 | L-10 | Methyl Methacrylate<br>Methyl Acrylate | 25 g<br>75 g | MA-13 | 2.5 g | 26° C. |
| 11 | L-11 | Ethyl Methacrylate<br>Ethyl Acrylate | 45 g<br>55 g | MA-8 | 3 g | 24° C. |
| 12 | L-12 | Ethyl Methacrylate<br>Methyl acrylate | 60 g<br>40 g | MA-16 | 4 g | 28° C. |
| 13 | L-13 | Methyl Methacrylate<br>2-Cyanoethyl Acrylate<br>Methyl Acrylate | 20 g<br>8 g<br>72 g | MA-14 | 2.5 g | 30° C. |
| 14 | L-14 | Vinyl Acetate<br>styrene<br>Vinyl Propionate | 80 g<br>10 g<br>10 g | MA-9 | 3 g | 35° C. |
| 15 | L-15 | Methyl Methacrylate<br>n-Propyl Methacrylate | 20 g<br>5 g<br>80 g | MA-11 | 2.8 g | 36° C. |

PREPARATION EXAMPLES 16 TO 19 OP RESIN PARTICLE

Preparation of Resin Particles (L-16) to (L-19)

Resin Particles (L-16) to (L-19) were prepared in the same manner as in Preparation Example 1 of Resin Particle expect for using Resins for Dispersion Stabilization (P) and Macromonomers (MA) shown in Table 5 below in place of Resin for Dispersion Stabilization (P-1) and Macromonomer (MA-1), respectively.

A polymerization rate of each of the resulting resin particles was in a range of from 97% to 98% and an average particle diameter thereof was in a range of form 0.3 μm to 0.4 μm with good monodispercity. The Mw of each of the resin particles was in a range of from $2 \times 10^5$ to $3 \times 10^5$, and a Tg thereof was in a range of from 37° C. to 38° C.

| | |
|---|---:|
| 10% Aqueous Solution of Gelatin | 120 g |
| Silica: Silysia 310 (manufactured by Fuji Silysia Chemical Co., Ltd.) | 80 g |
| 20% Solution of Colloidal Silica: Snowtex C (manufactured by Nissan Chemical Industries, Ltd.) | 40 g |
| Fluorinated Alkyl Ester: FC 430 (manufactured by 3M Co.) | 0.8 g |
| Hardening Compound [$CH_2$=$CHSO_2CH_2CONH(CH_2)_3NHCOCH_2SO_2CH$=$CH_2$] | 0.24 g |
| Water | 54 g |

TABLE 5

Resin for Dispersion Stabilization

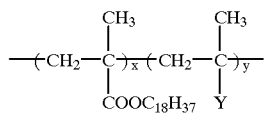

| Preparation Example | Resin Particle | —Y | x/y (weight ratio) | Macromonomer (MA) | |
|---|---|---|---|---|---|
| 16 | L-16 | 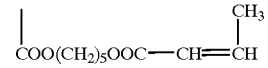 | 97/3 | MA-3 | 3 g |
| 17 | L-17 | 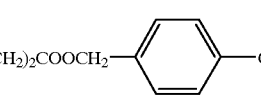 | 95/5 | MA-15 | 2.5 g |
| 18 | L-18 | 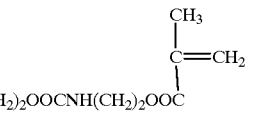 | 98/2 | MA-10 | 2 g |
| 19 | L-19 | 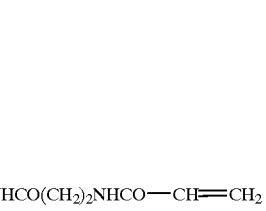 | 96/4 | MA-6 | 3 g |

PREPARATION EXAMPLE 20 OF RESIN PARTICLE

Preparation of Comparative Resin Particle (L-20)

Comparative Resin Particle (L-20) was prepared in the same manner as in Preparation Example 1 of Resin Particle expect for eliminating 4 g of Macromonomer (MA-1). The resin particles had a polymerization rate of 95% and an average particle diameter of 0.45 μm. The Mw of the resin particles was $3 \times 10^5$ and a Tg thereof was 37° C.

EXAMPLE 1

Preparation of Lithographic Printing Plate Precursor

A composition having the following component was placed in a paint shaker (manufactured by Toyo Seiki Co., Ltd.) together with glass beads and dispersed for 60 minutes. Then, the glass beads were removed by filtration to obtain a dispersion.

On a support of ELP-1X Type Master (manufactured by Fuji Photo Film Co., Ltd.) used as an electrophotographic lithographic printing plate precursor for small-scale commercial printing, the above-described composition was coated using a wire bar and dried at 100° C. for 10 minutes to form an image receiving layer having a coating amount of 18 g/m², thereby obtaining a lithographic printing plate precursor.

The Bekk smoothness of the surface of the printing plate precursor was 250 (second/10 ml), and the contact angle with water thereof was 0 degree.

The Bekk smoothness of the printing plate precursor was determined using a Bekk smoothness tester (manufactured by Kumagaya Riko Co., Ltd.) under the condition of an air volume of 10 ml as described hereinbefore.

The contact angle of the image receiving layer with water was determined by placing 2 μl of distilled water on the surface of the printing plate precursor and measuring the surface contact angle (degree) after 30 seconds using a surface contact angle meter (CA-D, manufactured by Kyowa Kaimen Kagaku Co., Ltd.) as described hereinbefore.

Preparation of Oil-Based Ink (IK-1) Ten grams of dodecyl methacrylate/acrylic acid copolymer (copolymerization ratio: 95/5 by weight), 10 g of Alkali Blue and 30 g of Shellsol 71 were placed in a paint shaker (manufactured by Toyo Seiki Co., Ltd.) together with glass beads and dispersed for 4 hours to obtain a fine dispersion of Alkali Blue.

Fifty grams (as a solid basis) of Resin Particle (L-1) according to Preparation Example 1 of Resin Particle, 18 g of the above-described Alkali Blue dispersion, 10 g of tetradecyl alcohol (FOC-1400 manufactured by Nissan Chemical Industries, Ltd.) and 0.16 g of octadecene-maleic acid monooctadecylamide copolymer were diluted with one liter of Isopar G, thereby obtaining blue oil-based ink.

A servo plotter (DA8400, manufactured by Graphtech Co.) able to write an output from a personal computer was converted so that an ink discharge head as shown in FIG. 2 was mounted on a pen plotter section, and the lithographic printing plate precursor described above was placed on a counter electrode positioned at a distance of 1.5 mm from the ink discharge head. Ink jet printing was performed on the lithographic printing plate precursor using Oil-Based Ink (IK-1) described above to make a plate. Successively, heating was carried out for 20 seconds using a Ricoh Fuser Model 592 (manufactured by Ricoh Co., Ltd.) so as to adjust the surface temperature of the ink image formed to 70° C., thereby sufficiently fixing the image area.

The image on the resulting printing plate was visually observed under an optical microscope of 200 magnifications. As a result, the image had no problem, fine lines and fine letters were good, defect such as blur, disappearance or spread was not recognized, and contamination was not observed in the non-image area.

The printing plate was subjected to printing using, as dampening water, a solution prepared by diluting SLM-OD (manufactured by Mitsubishi Paper Mills, Ltd.) 10 times with water, Oliver 94 Type (manufactured by Sakurai Seisakusho Co., Ltd.) as a printing machine, and a black ink for offset printing.

As a result, more than 1,000 sheets of prints having clear images without the occurrence of background stain were obtained.

Using the above-described ink jet printer, an ink ejection test was conducted. As a result, it was found that stable ink jet was obtained even after the lapse of 600 hours.

The oil-based ink of the present invention stored at room temperature for 6 months showed no formation of aggregates, and gave stable ink jet in the ink ejection test same as described above.

When a printing plate was prepared using the oil- based ink stored for 6 months and printing was conducted in the same manner as above, more than 1,000 sheets of prints having clear images without the occurrence of background stain were obtained.

Furthermore, the redispersibility of the oil-based ink was evaluated under enforced conditions. Specifically, the discharge head used in the above-described printer was filled with the ink, taken away and allowed to stand at 35° C. for 3 days. Then, the discharge head was immersed in Isopar G for 3 minutes, followed by mild stirring. Thereupon, Oil-Based Ink (IK-1) was all removed from the inside of the slit. This is considered to be caused by that the Oil-Based Ink (IK-1) adhered to the leading edge of the slit of the discharge head in the non-fluid state during the standing was easily redispersed upon the solvation with the dispersing medium.

From these results it can be seen that the oil-based ink of the present invention is excellent in stability of ink discharge and forms clear images without the occurrence of stain even when it has been continuously employed for a long period of time, and provides a printing plate having good press life.

COMPARATIVE EXAMPLE A

Comparative Example A was conducted in the same manner as in Example 1 with the exception that Oil-Base Ink (IKR-1) for Comparison described below was employed in place of Oil-Based Ink (IK-1) used in Example 1 to prepare a lithographic printing plate. Oil-Based Ink (IKR-i) for Comparison Oil-Base Ink (IKR-1) for Comparison was prepared in the same manner as in Oil-Based Ink (IK-1) with the exception that 50 g (as a solid basis) of Comparative Resin Particle (L-20) was employed in place of Resin Particle (L1) used in Oil-Based Ink (IK-1).

When the lithographic printing plate obtained in Comparative Example A described above was subjected to the printing in the same manner as in Example 1, more than 1,000 sheets of prints having clear images without the occurrence of background stain were obtained.

However, in the ink ejection test, Oil-Based Ink (IKR-1) for Comparison became unstable in ink discharge after the lapse of about 100 hours. Further, in Oil-Based Ink (IKR-1) for Comparison stored for 6 months, coagulated precipitates were deposited and not redispersed even on shaking in the dispersing medium.

EXAMPLE 2

Preparation of Lithographic Printing Plate Precursor

A composition having the following content was placed in a paint shaker (manufactured by Toyo Seiki Co., Ltd.) together with glass beads and dispersed for 60 minutes. Then, the glass beads were removed by filtration to obtain dispersion.

| | |
|---|---|
| 10% Aqueous Solution of Gelatin | 100 g |
| Silica: Silysia 310 (manufactured by Fuji Silysia Chemical Co., Ltd.) | 7 g |
| 10% Solution of Aluminasol 200 (manufactured by Nissan Chemical Industries, Ltd.) | 41 g |
| Fluorinated Alkyl Ester: FC 430 (manufactured by 3M Co.) | 0.8 g |
| Hardening Compound [$CH_2=CHSO_2CH_2CONH(CH_2)_3NHCOCH_2SO_2CH=CH_2$] | 0.30 g |
| Water | 54 g |

On a support of ELP-II Type Master (manufactured by Fuji Photo Film Co., Ltd.) used as an electrophotographic lithographic printing plate precursor for small-scale commercial printing, the above-described composition was coated using a wire bar and dried at 100° C. for 10 minutes to form an image-receiving layer having a coating amount of 18 g/m$^2$, thereby obtaining a lithographic printing plate precursor. The Beck smoothness of the surface of the image receiving layer was 200 (second/10 ml), and the contact angle with water thereof was 0 degree. Preparation of Oil-Based Ink (IK-2)

Ten grams of poly(dodecyl methacrylate), 10 g of nigrosine and 30 g of Isopar H were placed in a paint shaker (manufactured by Toyo Seiki Co., Ltd.) together with glass beads, and dispersed for 4 hours to obtain a fine black dispersion of nigrosine.

Fifty grams (as a solid basis) of Resin Particle (L-2) according to Preparation Example 2 of Resin Particle, 35 g of the above-described nigrosine dispersion and 0.08 g of octadecyl vinyl- ether-maleic acid monododecylamide copolymer were diluted with one liter of Isoper G, thereby preparing black oil-based ink.

Using the printing plate precursor and Oil-Based Ink (IK-2) described above, plate-making was conducted to prepare a printing plate and offset printing was performed in the same manner as in Example 1.

The resulting prints had clear images without the occurrence of stain in the non-image area similar to the prints obtained in Example 1, and the press life of the printing plate was as good as 1,000 sheets or more.

Further, with Oil-Based Ink (IK-2), the ink ejection test for 600 hours and the redispersibility test under enforced conditions were carried out in the same manner as in Example 1. Good results similar to those in Example 1 were obtained.

EXAMPLE 3

Using wood free paper having a basis weight of 100 g/m² as a substrate, one surface of the substrate was coated with a coating for a backcoat layer having the composition shown below using a wire bar to form the backcoat layer having a dry coating amount of 12 g/m². The Bekk smoothness of the surface of the backcoat layer was adjusted to about 50 (second/10 ml) by a calender treatment.

Coating for Backcoat Layer

| Kaolin (50% aqueous dispersion) | 200 parts |
|---|---|
| Polyvinyl Alcohol (10% aqueous solution) | 60 parts |
| SBR Latex (solid content: 50%, Tg: 0° C.) | 100 parts |
| Melamine Resin (solid content: 80%, Sumirez Resin SR-613) | 5 parts |

The other surface of the substrate was coated with each of Coatings A to G for an under layer having the composition shown in Table 6 below using a wire bar to form the under layer having a dry coating amount of 10 g/m². Then, a calender treatment was conducted so that the Bekk smoothness of the under layer is adjusted to about 1,500 (second/10 ml). The resulting seven water-resistant supports using Coatings A to G were designated Support Sample Nos. 1 to 7, respectively.

TABLE 6

| Coating for Under Layer | Coating Composition (% by weight on solid basis) | | | | Support Sample No. |
|---|---|---|---|---|---|
| | Carbon Black | Clay | SBR Latex | Melamine Resin | |
| A | 0 | 60 | 36 | 4 | 1 |
| B | 3 | 57 | 36 | 4 | 2 |
| C | 5.4 | 54.6 | 36 | 4 | 3 |
| D | 7.2 | 52.8 | 36 | 4 | 4 |

TABLE 6-continued

| Coating for Under Layer | Coating Composition (% by weight on solid basis) | | | | Support Sample No. |
|---|---|---|---|---|---|
| | Carbon Black | Clay | SBR Latex | Melamine Resin | |
| E | 9 | 51 | 36 | 4 | 5 |
| F | 15 | 45 | 36 | 4 | 6 |
| G | 30 | 30 | 36 | 4 | 7 |

Coating for Under Layer

Carbon Black (30% aqueous dispersion)
Clay (50% aqueous dispersion)
SBR Latex (solid content: 50%, Tg: 25° C.)
Melamine Resin (solid content: 80%, Sumirez Resin SR-613)

The components were mixed according to the amounts shown in Table 6 above, and water was added thereto to adjust the total solid content to 25%, thereby obtaining Coatings A to G for the under layer.

Specific Electric Resistance of Under Layer

The specific electric resistance of the under layer was measured in the following manner.

Each of Coatings A to G for the under layer was coated on a sufficiently degreased and washed stainless plate to prepare a layer having a dry coating amount of 10 g/m². The specific electric resistance of the resulting seven samples were measured by a three terminal process having a guard electrode according to JIS K-6911. The results are shown in Table 7 below.

TABLE 7

| Coating for Under Layer | Specific Electric Resistance (Ωcm) |
|---|---|
| A | $2 \times 10^{12}$ |
| B | $1 \times 10^{11}$ |
| C | $4 \times 10^{9}$ |
| D | $1 \times 10^{8}$ |
| E | $7 \times 10^{4}$ |
| F | $5 \times 10^{3}$ |
| G | $4 \times 10^{3}$ |

Preparation of Lithographic Printing Plate Precursor

On the under layer of each of Support Sample Nos. 1 to 7 was coated a dispersion having the same composition as described in Example 1 to form an image receiving layer having a dry coating amount of 6 g/m², whereby Lithographic Printing Plate Precursor Sample Nos. 1 to 7 were prepared. The Bekk smoothness of the surface of each printing plate precursor was in a range of from 200 to 230 (second/10 ml), and the contact angle with water thereof was 5 degrees.

Using the lithographic printing plate precursors thus prepared, plate making was conducted with Oil-Based Ink (IK-1) in the same manner as in Example 1. The counter electrode was electrically connected with the under layer provided directly under the image receiving layer of the precursor using silver paste at the plate making.

Then, the printing plates were subjected to printing using a fully automatic printing machine (AM-2850 manufactured by AM Co., Ltd.) provided with a solution prepared by diluting ELP-E2 (manufactured by Fuji Photo Film Co., Ltd.) 10 times with distilled water, as dampening water, in a dish for dampening water thereof and a black ink for offset printing.

The properties of the printing plates and the prints obtained were evaluated with respect to the points shown below. The results are shown in Table 8 below.

TABLE 8

| Lithographic Printing Plate Precursor Sample No. | Support Sample No. | Image Quality of Printing Plate[1] | Image Quality of Print[2] | Press Life[3] |
|---|---|---|---|---|
| 1 | 1 | Poor | Poor | 50 |
| 2 | 2 | Poor | Poor | 100 |
| 3 | 3 | Good | Good | 1500 |
| 4 | 4 | Very Good | Very Good | 3000 |
| 5 | 5 | Very Good | Very Good | 3000 |
| 6 | 6 | Very Good | Very Good | 3000 |
| 7 | 7 | Very Good | Very Good | 3000 |

1) Image Quality of Printing Plate

Images on the printing plate were visually observed under an optical microscope of 200 magnifications. The results were evaluated as follows:

Very good: Completely no problem in images, very good fine lines and fine letters Good: No problem in images, good fine lines and fine letters Poor: Disappearance or blur of fine lines and fine letters 2) Image Quality of Print The images of the print were evaluated in the same manner as the image quality of the printing plate described above. The image quality of the print was the same as that of the printing plate in each sample.

3) Press Life

The number of prints obtained was counted until background stain or disappearance of image was visually recognized on the print.

With Lithographic Printing Plate Precursor Sample Nos. 4 to 7 wherein the support having an under layer of a small specific electrical resistance of $10^8$ to $10^3$ Ωcm is used, the images have no problem at all, reproduction of fine lines and fine letters is very good, and press life is also excellent. On the contrary, with Lithographic Printing Plate Precursor Sample Nos. 1 and 2 wherein the support having an under layer of a large specific electrical resistance of $10^{12}$ to $10^{11}$ μcm is used, disappearance or blur of image occurs on the printing plate. Due to the blur, the resin layer of the image becomes thin and as a result, press life is poor.

These results indicate that the higher the electroconductivity of the under layer provided directly under the image receiving layer, the better the image quality of printing plate and the image quality of print.

EXAMPLES 4 TO 20

Plate making and printing were conducted in the same manner as in Example 1 with the exception that each oil-based ink described in Table 9 shown below was used in place of Oil-Based Ink (IK-1). The oil-based ink used were prepared in the same manner as in Oil-Based Ink (IK-1) except for using 50 g (as a solid basis) of Resin Particles (L) described in Table 9 shown below in place of Resin Particle (L-1), respectively.

TABLE 9

| Example | Oil-Based Ink | Resin Particle (L) |
|---|---|---|
| 4 | IK-3 | L-8 |
| 5 | IK-4 | L-3 |
| 6 | IK-5 | L-4 |

TABLE 9-continued

| Example | Oil-Based Ink | Resin Particle (L) |
|---|---|---|
| 7 | IK-6 | L-5 |
| 8 | IK-7 | L-6 |
| 9 | IK-8 | L-7 |
| 10 | IK-9 | L-9 |
| 11 | IK-10 | L-10 |
| 12 | IK-11 | L-11 |
| 13 | IK-12 | L-12 |
| 14 | IK-13 | L-13 |
| 15 | IK-14 | L-14 |
| 16 | IK-15 | L-15 |
| 17 | IK-16 | L-16 |
| 18 | IK-17 | L-18 |
| 19 | IK-18 | L-19 |
| 20 | IK-19 | L-17 |

It has been found that the images on each printing plate had good qualities similar to those in Example 1, and the press life of each printing plate was more than 1,000 sheets.

Further, the ink ejection test for 600 hours and the redispersibility test under enforced conditions were performed in the same manner as in Example 1. Each oil-based ink exhibited good results similar to or more than those of Oil-Based Ink (IK-1) used in Example 1.

EXAMPLE 21

Preparation of Water-Resistant Support

Using wood free paper having a basis weight of 100 g/m² as a substrate, one. surface of the substrate was coated with a coating for an under layer having the composition shown below using a wire bar to form the under layer having a dry coating amount of 10 g/m². The Bekk smoothness of the surface of the under layer was 150 (second/10 ml), and adjusted to 1,500 (second/10 ml) by a calender treatment.

Coating for Under Layer

| | |
|---|---|
| Silica gel | 10 parts |
| SBR Latex | 92 parts |
| (50% aqueous dispersion, Tg: 25° C.) | |
| Clay (45% aqueous dispersion) | 110 parts |
| Melamine (80% aqueous solution) | 5 parts |
| Water | 191 parts |

The other surface of the substrate was coated with a coating for a backcoat layer having the composition shown below using a wire bar to form the backcoat layer having a dry coating amount of 12 g/m². Then, a calender treatment was conducted so that the Bekk smoothness of the backcoat layer is adjusted to about 50 (second/10 ml). Coating for Backcoat Layer

| | |
|---|---|
| Kaolin (50% aqueous dispersion) | 200 parts |
| Polyvinyl Alcohol | 60 parts |
| (10% aqueous solution) | |
| SBR Latex | 100 parts |
| (solid content: 49%, Tg 0° C.) | |
| Primary Condensation Product of | 5 parts |
| Melamine Resin (solid content: 80%, | |
| Sumirez Resin SR-613) | |

Preparation of Lithographic Printing Plate Precursor

A composition having the following component was placed in a paint shaker together with glass beads and dispersed for 80 minutes. Then, the glass beads were removed by filtration to obtain a dispersion.

| | |
|---|---|
| Silica: Silysia 445 (manufactured by Fuji Silysia Chemical Co., Ltd.) | 40 g |
| 20% Solution of Colloidal Silica: Snowtex C (manufactured by Nissan Chemical Industries, Ltd.) | 200 g |
| 50% Dispersion of Clay | 40 g |
| 10% Solution of Polyvinyl Alcohol: PVA-117 (manufactured by Kuraray Co., Ltd.) | 120 g |
| Melamine Resin | 2.0 g |
| Ammonium Chloride | 0.2 g |
| Water | 50 g |

The dispersion was coated on the under layer of the above-described water-resistant support using a wire bar and dried to form an image receiving layer having a coating amount of 20 g/m², thereby obtaining a lithographic printing plate precursor. The Bekk smoothness of the surface of the printing plate precursor was 150 (second/10 ml), and the contact angle with water thereof was 0 degree.

The printing plate precursor was subjected to plate making to prepare a lithographic printing plate and printing in the same manner as in Example 1 except for using Oil-Based Ink (IK-20) having the composition shown below in place of Oil-Based Ink (IK-1) employed in Example 1.

Preparation of Oil-Based Ink (IK-20)

A mixture of 500 g of a white dispersion of Resin Particle (L-5) according to Preparation Example 5 of Resin Particle and 7.5 g of Sumikaron Black was heated to a temperature of 100° C. and stirred for 6 hours under heating. After cooling to room temperature, the mixture was passed through a nylon cloth of 200 mesh to remove the remaining dye, thereby obtaining a black resin dispersion having an average particle diameter of 0.40 Rm.

Then, 250 g of the above-described black resin dispersion, 0.10 g of Charge Control Agent (CD-3) shown below and 10 g of hexadecyl alcohol (FOC-1600 manufactured by Nissan Chemical Industries, Ltd.) were diluted with one liter of Isopar G, thereby preparing black oil-based ink.

Charge Control Agent CD-3

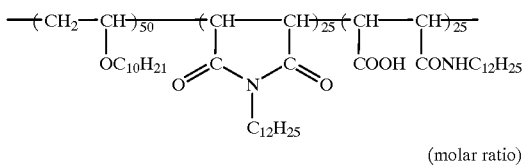

(molar ratio)

The prints thus-obtained had clear images without the occurrence of stain in the non-image area similar to the prints obtained in Example 1, and the press life of the printing plate was good as 1,000 sheets or more.

Further, with Oil-Based Ink (IK-20), the ink ejection test for 600 hours and the redispersibility test under enforced conditions were performed in the same manner as in Example 1. As a result, Oil-Based Ink (IK-20) exhibited good results similar to those of Oil-Based Ink (IK-1).

EXAMPLE 22

Plate-making and printing were carried out in the same manner as in Example 1 except for using Oil-Based Ink (IK-21) having the composition shown below in place of Oil- Based Ink (IK-1) employed in Example 1.

Preparation of Oil-Based Ink (IK-21)

A mixture of 300 g of a white dispersion of Resin Particle (L-6) according to Preparation Example 6 of Resin Particle and 5 g of Victoria Blue B was heated to a temperature of 100° C. and stirred for 4 hours under heating. After cooling to room temperature, the mixture was passed through a nylon cloth of 200 mesh to remove the remaining dye, thereby obtaining a blue resin dispersion having an average particle diameter of 0.38 µm.

Then, 260 g of the above-described blue resin dispersion and 0.10 g of zirconium naphthenate were diluted with one liter of Shellsol 71, thereby preparing blue oil-based ink.

The prints thus-obtained had clear images without the occurrence of stain in the non-image area similar to the prints obtained in Example 1, and the press life of the printing plate was good as 1,000 sheets or more.

Further, with Oil-Based Ink (IK-21), the ink ejection test for 600 hours and the redispersibility test under enforced conditions were performed in the same manner as in Example 1. As a result, Oil-Based Ink (IK-21) exhibited good results similar to those of Oil-Based Ink (IK-1).

While the invention has been described in detail and with reference to specific embodiments thereof, it will be apparent to one skilled in the art that various changes and modification can be made therein without departing from the spirit and scope thereof.

What is claimed is:

1. A method for preparing a printing plate by an ink jet process consisting essentially of discharging dropwise an oil-based ink using electrostatic attraction from a head having a discharge electrode on a lithographic printing plate precursor positioned between the discharge electrode and a counter electrode to form an image, wherein the lithographic printing plate precursor comprises a water-resistant support having provided thereon an image-receiving layer having a lithographically printable hydrophilic surface for forming the image, the water resistant support has a specific electric resistance of $10^{10}$ Ωcm or less at least at an area directly under the image receiving layer, the oil-based ink comprises positively or negatively charged electroscopic resin particles dispersed in a nonaqueous carrier liquid having an electric resistance of $10^9$ Ωcm or more and a dielectric constant of 3.5 or less, and the resin particles dispersed are copolymer resin particles obtained by polymerization granulation of a solution comprising (i), (ii) and (iii):

(i) at least one monofunctional monomer (A) which is soluble in a nonaqueous solvent that is at least miscible with the nonaqueous carrier liquid and becomes insoluble in the nonaqueous solvent by polymerization;

(ii) at least one monofunctional macromonomer (MA) having a weight average molecular weight of $2 \times 10^4$ or less in which a polymerizable double bond group represented by the formula (II) shown below is connected with only one terminal of the main chain of a polymer comprising a repeating unit corresponding to a monomer and represented by the formula (I) shown below;

(I)

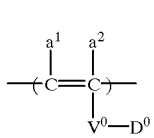

wherein $V^0$ represents —COO—, —OCO—, —$(CH_2)_r$COO—, —$(CH_2)_r$OCO—, —O—, —$SO_2$—, —CONHCOO—, —CONHCONH—, —CON($D^{11}$)—, —$SO_2N(D^{11})$— or a phenylene group, in which $D^{11}$ represents a hydrogen atom or a hydrocarbon group having from 1 to 22 carbon atoms, and r represents an integer of from 1 to 4;

$a^1$ and $a^2$, which may be the same or different, each represents a hydrogen atom, a halogen atom, a cyano group, a hydrocarbon group, —COO—$D^{12}$ or —COO—$D^{12}$ linked through a hydrocarbon group, in which $D^{12}$ represents a hydrogen atom or a hydrocarbon group which may be substituted;

$D^0$ represents a hydrocarbon group having from 8 to 22 carbon atoms or a substituent having a total number of atoms of 8 or more, provided that hydrogen atoms directly attached to a carbon or nitrogen atom are excluded from the number, represented by the following formula (Ia):

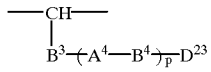 (Ia)

wherein $D^{21}$ represents a hydrogen atom or a hydrocarbon group having from 1 to 22 carbon atoms;

$B^1$ and $B^2$, which may be the same or different, each represents —O—, —CO—, —CO$_2$—, —OCO—, —SO$_2$—, —N($D^{22}$)—, —CON($D^{22}$)—, or —N($D^{22}$)CO—, in which $D^{22}$ has the same meaning as defined for $D^{22}$ above;

$A^1$ and $A^2$, which may be the same or different, each represents at least one group selected from the group consisting of a group represented by the formula (Ib) shown below and a hydrocarbon group having from 1 to 18 carbon atoms, which may be substituted, provided that, in the case of two or more, it represents a combination of the group represented by the formula (Ib) and/or the hydrocarbon group:

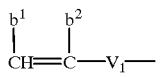 (Ib)

wherein $B^3$ and $B^4$, which may be the same or different, each has the same meaning as defined for $B^1$ and $B^2$ above;

$A^4$ represents a hydrocarbon group having from 1 to 18 carbon atoms which may be substituted;

$D^{23}$ has the same meaning as defined for $D^{21}$ above; and m, n and p, which may be the same or different, each represents an integer of from 0 to 4, provided that m and n are not 0 at the same time;

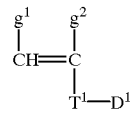 (II)

wherein $V^1$ represents —COO—, —CONHCOO—, —CONHCONH—, —CONH— or a phenylene group; and $b^1$ and $b^2$, which may be the same or different, each has the same meaning as defined for al or a in the formula (I);

(iii) at least one resin for dispersion stabilization (P) which is soluble in the nonaqueous solvent and comprises a copolymer component represented by the formula (III) shown below:

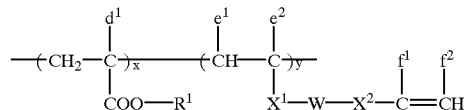 (III)

wherein $R^1$ represents an alkyl group having from 10 to 32 carbon atoms or an alkenyl group having from 10 to 32 carbon atoms;

$d^1$ represents a hydrogen atom or an alkyl group having from 1 to 4 carbon atoms;

$X^1$ and $X^2$, which may be the same or different, each has the same meaning as defined for $V^1$ in the formula (I);

W represents a group connecting $X^1$ and $X^2$ and comprising at least one of a carbon atom and a hetero atom selected from an oxygen atom, a sulfur atom, a silicon atom and a nitrogen atom;

$e^1$, $e^2$, $f^1$ and $f^2$, which may be the same or different, each has the same meaning as defined for $a^1$ or $a^2$ in the formula (I); and x and y each represents a weight ratio of each repeating unit, x represents a number of from 90 to 99, y represents a number from 10 to 1.

2. The method of claim 1, wherein the monofunctional monomer (A) is a monomer represented by the following formula (IV):

 (IV)

wherein $T^1$ represents —COO—, —OCO—, —CH$_2$OC—, —CH$_2$COO—, —O—, —CONHCOO—, —CONHOCO—, —SO$_2$—, —CON(W$^1$)—, —SO$_2$N(W$^1$)—, or a phenylene group, wherein $W^1$ represents a hydrogen atom or an aliphatic group having from 1 to 8 carbon atoms which may be substituted; $D^1$ represents a hydrogen atom or an aliphatic group having from 1 to 6 carbon atoms which may be substituted; and $g^1$ and $g^2$, which may be the same or different, each represents a hydrogen atom, a halogen atom, a cyano group, a hydrocarbon group, —COO—$D^{12}$— or —COO—$D^{12}$— linked through a hydrocarbon group-wherein $D^{12}$ represents a hydrogen atom or a hydrocarbon group which may be substituted[)].

3. The method of claim 1, wherein the monofunctional macromonomer (MA) is a macromonomer represented by the following formula (V):

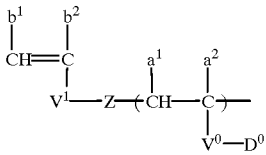 (V)

wherein symbols other than z have the same meanings as defined for those in the formulas (I) and (II), respectively; and z represents a single bond or a connecting group.

4. The method of claim 1, wherein the repeating unit represented by the formula (I) is present in the macromonomer (MA) in an amount of 60% by weight or more of the total amount of the repeating units contained therein.

5. The method of claim 1, wherein the macromonomer (MA) has a weight average molecular weight of from $1\times10^3$ to $2\times10^4$.

6. The method of claim 1, wherein the amount of the monofunctional macromonomer (MA) is from 0.1% to 20% by weight based on the amount of the monomer (A).

7. The method of claim 1, wherein the amount of the resin for dispersion stabilization (P) is from 3 to 25 parts by weight of the total amount of the monomers.

8. The method of claim 1, wherein the oil-based ink further comprises a coloring material.

9. The method for the preparation of a printing plate by an ink jet process as claimed in claim 1, wherein the water-resistant support is a support having a specific electric resistance of 10 Ωcm or less as a whole of the support.

* * * * *